US012769400B2

(12) United States Patent
Wakuda

(10) Patent No.: US 12,769,400 B2
(45) Date of Patent: Oct. 20, 2026

(54) PEN-TYPE INPUT DEVICE AND INPUT SYSTEM

(71) Applicant: ALPS ALPINE CO., LTD., Tokyo (JP)

(72) Inventor: Hiroshi Wakuda, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 19/387,003

(22) Filed: Nov. 12, 2025

(65) Prior Publication Data

US 2026/0072512 A1 Mar. 12, 2026

Related U.S. Application Data

(63) Continuation of application No. PCT/JP2024/008001, filed on Mar. 4, 2024.

(30) Foreign Application Priority Data

May 22, 2023 (JP) ................................ 2023-083860

(51) Int. Cl.
*G06F 3/01* (2006.01)
*B06B 1/02* (2006.01)
(Continued)

(52) U.S. Cl.
CPC ............ *G06F 3/016* (2013.01); *B06B 1/0215* (2013.01); *G06F 3/03545* (2013.01); *G06F 3/038* (2013.01); *G02F 1/13338* (2013.01)

(58) Field of Classification Search
CPC ..... B06B 1/0215; G02F 1/13338; G06F 3/01; G06F 3/016; G06F 3/03; G06F 3/03545; G06F 3/038; G06F 3/0383; G06F 3/041
See application file for complete search history.

(56) References Cited

U.S. PATENT DOCUMENTS

2010/0090815 A1 4/2010 Yamaya
2014/0198069 A1 7/2014 Park et al.
(Continued)

FOREIGN PATENT DOCUMENTS

JP 2014-222492 11/2014
WO 2008/078523 7/2008
WO 2021/193421 9/2021

OTHER PUBLICATIONS

International Search Report for PCT/JP2024/008001 mailed on Apr. 9, 2024.

*Primary Examiner* — Stacy Khoo
(74) *Attorney, Agent, or Firm* — IPUSA, PLLC

(57) ABSTRACT

A pen-type input device includes: a pen body; a vibration actuator accommodated inside the pen body; a pen category selection processor configured to select a first pen category or a second pen category; a storage configured to store a first and a second vibration waveform, the first vibration waveform corresponding to the first pen category, and the second vibration waveform corresponding to the second pen category; a control processor configured to perform drive control of the vibration actuator based on the first vibration waveform corresponding to the first pen category or the second vibration waveform corresponding to the second pen category, the first pen category or the second pen category being selected by the pen category selection processor; and a writing-velocity detection processor configured to detect a writing velocity of the pen body.

19 Claims, 13 Drawing Sheets

(51) Int. Cl.

| | |
|---|---|
| ***G06F 3/0354*** | (2013.01) |
| ***G06F 3/038*** | (2013.01) |
| *G02F 1/1333* | (2006.01) |

(56) References Cited

U.S. PATENT DOCUMENTS

| | | | |
|---|---|---|---|
| 2014/0285453 | A1 | 9/2014 | Park et al. |
| 2014/0340326 | A1 | 11/2014 | Kameyama et al. |
| 2022/0129091 | A1 * | 4/2022 | Kumar ................ G06F 3/03545 |

* cited by examiner

FIG.4A

VIBRATION CHARACTERISTICS IN PEN SHAFT DIRECTION

| | FUNDAMENTAL FREQUENCY freq [Hz] | VELOCITY PROPORTIONAL COEFFICIENT a1 [G/(deg/sec)] | WRITING-PRESSURE PROPORTIONAL COEFFICIENT f1 [G/N] | WRITING-PRESSURE CONSTANT f0 [G] | TIME-INTERVAL PROPORTIONAL COEFFICIENT k1 [s/(deg/s)] | TIME-INTERVAL CONSTANT k0 [sec] | VIBRATION-INTENSITY STANDARD DEVIATION sigma2 | TIME-INTERVAL STANDARD DEVIATION sigma1 |
|---|---|---|---|---|---|---|---|---|
| BALLPOINT PEN | 182 | 0.004 | 0.89 | −0.1 | −1.06E−04 | 0.0068 | 0.8 | 0.42 |
| MARKER PEN | 425 | − | 0.14 | −0.13 | − | 0.0024 | 1.1 | 0.43 |
| FELT-TIP PEN | 384 | − | 0.046 | 0.1 | −1.27E−05 | 0.0026 | 0.77 | 0.4 |
| MECHANICAL PENCIL | 247 | − | 0.0046 | 0.09 | − | 0.0016 | 0.58 | 0.43 |
| FOUNTAIN PEN (WRITING DIRECTION: LATERAL) | 331 | 0.004 | 0.14 | 0.09 | −9.70E−06 | 0.0033 | 0.74 | 0.53 |
| FOUNTAIN PEN (WRITING DIRECTION: LONGITUDINAL) | 267 | 0.016 | 0.28 | 0.12 | −1.90E−04 | 0.0045 | 0.86 | 0.6 |

FIG.4B

VIBRATION CHARACTERISTICS IN WRITING DIRECTION

| | FUNDAMENTAL FREQUENCY freq [Hz] | VELOCITY PROPORTIONAL COEFFICIENT a1 [G/(deg/sec)] | WRITING-PRESSURE PROPORTIONAL COEFFICIENT f1 [G/N] | WRITING-PRESSURE CONSTANT f0 [G] | TIME-INTERVAL PROPORTIONAL COEFFICIENT k1 [s/(deg/s)] | TIME-INTERVAL CONSTANT k0 [sec] | VIBRATION-INTENSITY STANDARD DEVIATION sigma2 | TIME-INTERVAL STANDARD DEVIATION sigma1 |
|---|---|---|---|---|---|---|---|---|
| BALLPOINT PEN | 190 | 0.0044 | 0.33 | −0.067 | −5.20E−05 | 0.005 | 0.8 | 0.45 |
| MARKER PEN | 525 | 0.012 | 0.6 | −0.3 | − | 0.003 | 0.6 | 0.57 |
| FELT-TIP PEN | 492 | − | 0.052 | 0.2 | −6.80E−05 | 0.0035 | 0.82 | 0.51 |
| MECHANICAL PENCIL | 274 | − | 0.01 | 0.2 | − | 0.001 | 1.1 | 0.4 |
| FOUNTAIN PEN (WRITING DIRECTION: LATERAL) | 314 | 0.013 | 0.37 | −0.22 | −5.40E−05 | 0.0057 | 1.1 | 0.47 |
| FOUNTAIN PEN (WRITING DIRECTION: LONGITUDINAL) | 146 | 0.059 | 0.64 | −0.3 | − | 0.0078 | 0.95 | 0.6 |

<BALLPOINT PEN>

<MECHANICAL PENCIL>

PEN-TYPE INPUT DEVICE AND INPUT SYSTEM

CROSS-REFERENCE TO RELATED APPLICATIONS

This application is a continuation application of International Application No. PCT/JP2024/008001, filed on Mar. 4, 2024, and designated the U.S., which claims priority to Japanese Patent Application No. 2023-083860, filed on May 22, 2023, the entire content of each of which is incorporated herein by reference.

BACKGROUND OF THE INVENTION

1. Field of the Invention

The present disclosure relates to a pen-type input device and an input system.

2. Description of the Related Art

There has been an electronic handwriting input system for electronically executing handwriting input, which includes an information writing input unit used for handwritten information writing input by an operator, and an information writing input detection unit configured to detect the information writing input by the information writing input unit. The electronic handwriting input system includes a writing-feel presentation unit configured to generate, in the information writing input means, vibration corresponding to a writing feel in accordance with an operation of the information writing input unit at the time of information writing input, a storage unit configured to store a vibration waveform generated by writing on a writing target with a writing instrument, and an operation unit configured to perform various types of input.

The storage unit is configured to store information on a thickness, hardness, smoothness, and elasticity of a pen tip of the writing instrument in association with the vibration waveform, and store information on a surface condition of the writing target in association with the vibration waveform. The vibration waveform stored in the storage means is read based on the information on the writing instrument or the information on the writing target input from the operation unit. The writing-feel presentation unit generates the vibration reproducing the vibration generated by the writing instrument and the writing target in accordance with the vibration waveform read from the storage unit. For example, see International Publication No. 2008/078523 (Japanese Patent No. 5093117).

Incidentally, in the electronic handwriting input system, the information (data) on the thickness, hardness, smoothness, and elasticity of the pen tip of the writing instrument is stored in association with the vibration waveform. However, it is difficult to present a tactile sensation from these data as if actual writing were being performed.

SUMMARY OF THE INVENTION

Therefore, a pen-type input device and an input system capable of presenting a tactile sensation of actual writing are provided.

A pen-type input device according to an embodiment of the present disclosure includes: a pen body; a vibration actuator accommodated inside the pen body; a pen category selection processor configured to select a first pen category or a second pen category; a storage configured to store a first vibration waveform and a second vibration waveform, the first vibration waveform corresponding to the first pen category, and the second vibration waveform corresponding to the second pen category; a control processor configured to perform drive control of the vibration actuator based on the first vibration waveform corresponding to the first pen category or the second vibration waveform corresponding to the second pen category, the first pen category or the second pen category being selected by the pen category selection processor; and a writing-velocity detection processor configured to detect a writing velocity of the pen body, in which the control processor is further configured to: drive the vibration actuator so as to increase a vibration intensity by a first degree as the writing velocity increases, when the first pen category is selected by the pen category selection processor, and drive the vibration actuator so as to increase the vibration intensity by a second degree, which is smaller than the first degree, as the writing velocity increases, or drive the vibration actuator with the vibration intensity of a constant level regardless of the writing velocity, when the second pen category is selected by the pen category selection processor.

BRIEF DESCRIPTION OF THE DRAWINGS

FIG. 4A shows examples of vibration characteristics obtained from the measurement results of temporal changes in acceleration, writing angular velocity, and writing pressure;

FIG. 4B shows examples of vibration characteristics obtained from the measurement results of temporal changes in acceleration, writing angular velocity, and writing pressure;

DESCRIPTION OF THE EMBODIMENTS

Hereinafter, embodiments, to which a pen-type input device and an input system of the present disclosure are applied, will be described.

An XYZ coordinate system is defined and explained below. A direction parallel to the X axis (X direction), a direction parallel to the Y axis (Y direction), and a direction parallel to the Z axis (Z direction) are orthogonal to one another. In the following description, for convenience of explanation, the −Z direction side may be referred to as a lower side or down, and the +Z direction side may be referred to as an upper side or up. However, such expressions do not represent a universal upper/lower relationship. The term “plan view” used herein refers to viewing in the XY plane.

In the following description, for ease of understanding the configuration, a length, a diameter, a thickness, and the like of each component may be depicted with emphasis. The terms “parallel,” “up,” “down,” and the like are interpreted as allowing deviations insofar as the effects of the embodiments are preserved.

EMBODIMENTS

Figure 1A:
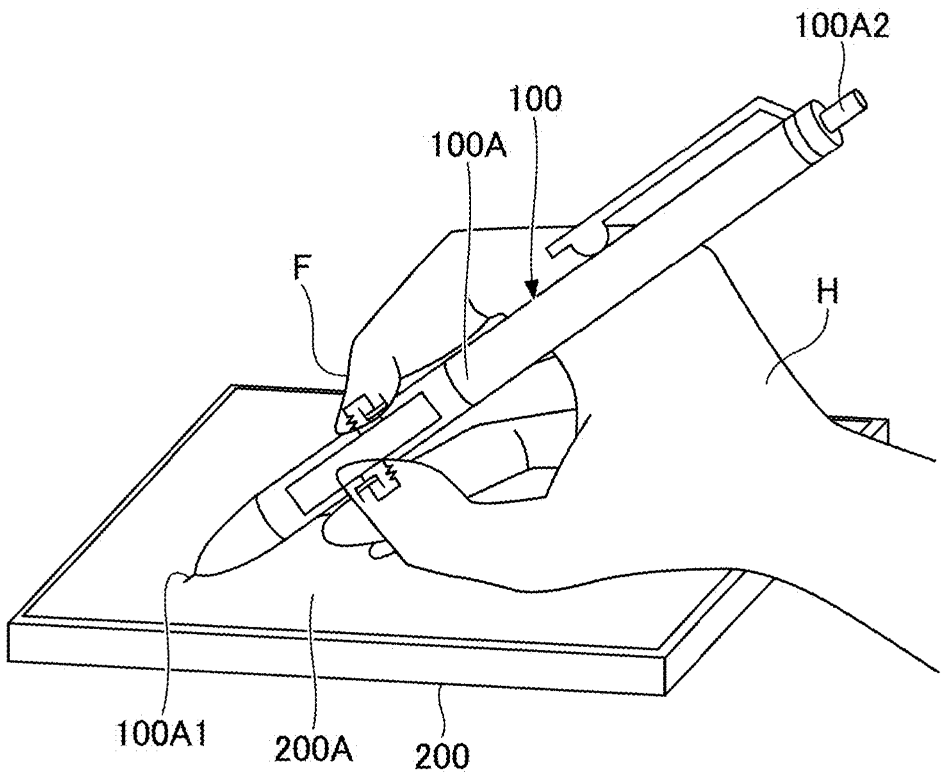
FIG. 1A is a view illustrating an example of a usage state of a pen-type input device according to an embodiment.

FIG. 1A is a view illustrating an example of a usage state of a pen-type input device 100 according to an embodiment. FIG. 1A illustrates a tablet computer 200 operable with the pen-type input device 100. The tablet computer 200 is an example of an electronic device. The tablet computer 200 has an operation surface 200A. The operation surface 200A is an example of a writing surface on which writing can be performed with the pen-type input device 100. The operation surface 200A is, for example, a surface of a top panel disposed over a liquid crystal display. As an example, an electrostatic sensor capable of detecting coordinates of an operation position on the operation surface 200A may be provided between the liquid crystal display and the top panel.

A user grips the pen-type input device 100 with a hand H and touches the operation surface 200A of the tablet computer 200 with a distal end of the pen-type input device 100, thereby operating the tablet computer 200.

The pen-type input device 100 has a pen body 100A. The pen body 100A is a pen part of the pen-type input device 100 visible from the outside, and includes a distal end 100A1 and a cap 100A2. The pen-type input device 100 includes a vibration element, a driver, a control unit, a gyroscope sensor, a writing-pressure sensor, a battery, and the like inside the pen body 100A, although they are omitted in FIG. 1A.

When such a system from the pen-type input device 100 to the hand H is considered in approximation to a mechanical model, the system can be represented as an elastic mechanical model in which a spring and a damper are present between a finger F of the hand H and the pen body 100A.

<Internal Configuration of Pen-Type Input Device 100>

Figure 1B:
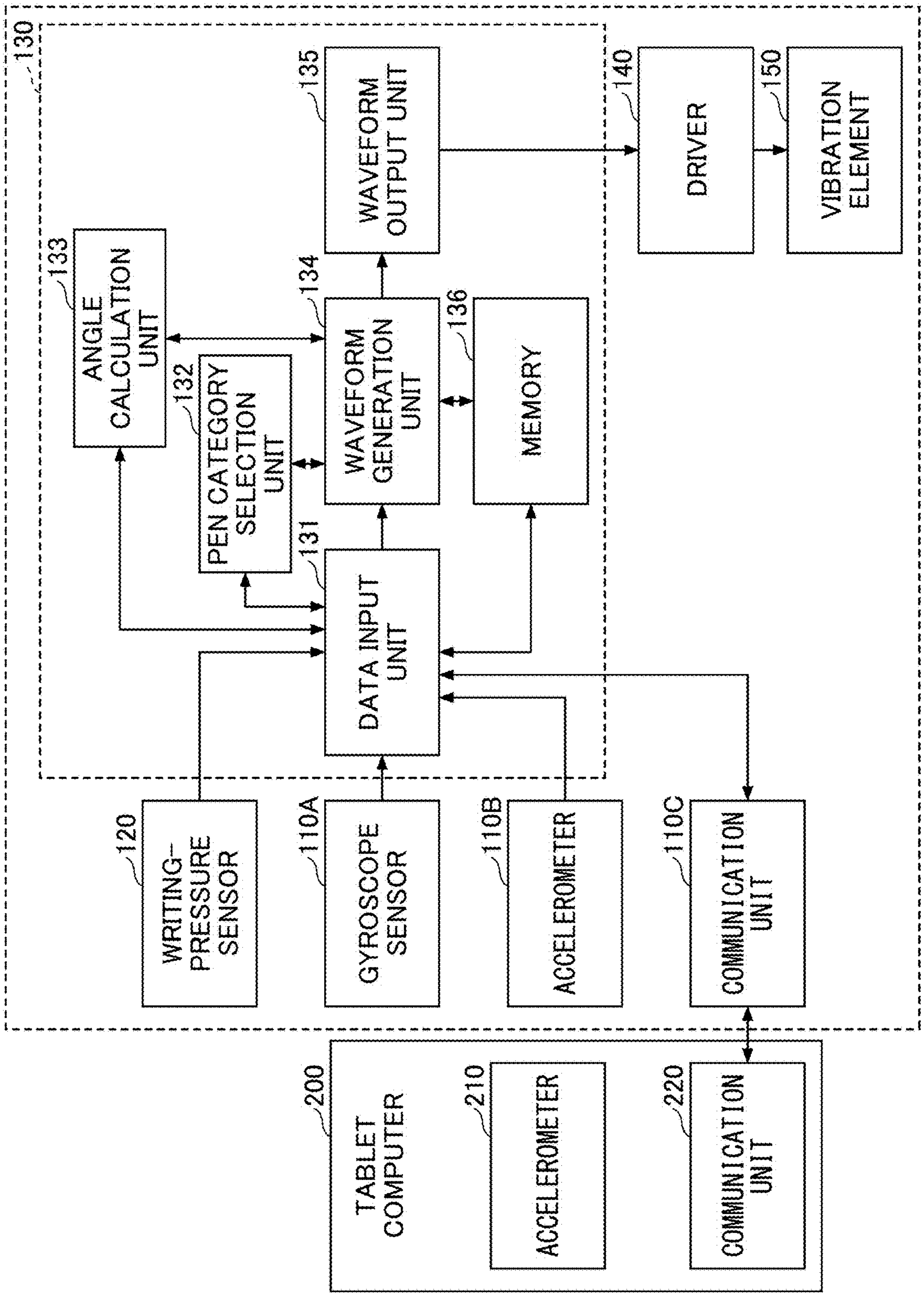
FIG. 1B is a block diagram illustrating an internal configuration of the pen-type input device according to the embodiment.

FIG. 1B is a block diagram illustrating an internal configuration of the pen-type input device 100. The pen-type input device 100 includes a gyroscope sensor 110A, an accelerometer 110B, a communication unit 110C, a writing-pressure sensor 120, a controller 130, a driver 140, and a vibration element 150. The gyroscope sensor 110A is an example of a velocity detection unit. The accelerometer 110B is an example of an attitude detection unit. The communication unit 110C is an example of an acquisition unit. The writing-pressure sensor 120 is an example of a writing-pressure detection unit. The vibration element 150 is an example of a vibration actuator. These are housed inside the pen body 100A.

The gyroscope sensor 110A detects a writing angular velocity generated in the pen-type input device 100. The gyroscope sensor 110A detects an angular velocity (writing angular velocity) generated during writing. To perform a writing operation with the pen-type input device 100, the user moves a finger holding the pen-type input device 100, thereby moving a pen tip. The writing angular velocity detected by the gyroscope sensor 110A at this time can be approximated as a writing velocity of the pen body 100A. Therefore, the writing angular velocity detected by the gyroscope sensor 110A is approximated as the writing velocity in the pen-type input device 100.

The gyroscope sensor 110A is connected to the controller 130 and outputs the detected writing angular velocity to the controller 130. In addition to the writing angular velocity, the gyroscope sensor 110A may detect a three-dimensional attitude of the pen-type input device 100 and output the detected attitude to the controller 130.

The gyroscope sensor 110A may be disposed at any position inside the pen body 100A, such as near the distal end 100A1, near the cap 100A2, or between the distal end 100A1 and the cap 100A2. This is because the angular velocity generated in the pen body 100A during writing is the same at any position in the pen body 100A.

The accelerometer 110B detects an acceleration generated in the pen-type input device 100. The acceleration generated in the pen-type input device 100 is an acceleration generated in the pen body 100A, and represents an attitude of the pen body 100A. A three-axis accelerometer may be used as an example of such an accelerometer 110B. The accelerometer 110B outputs the detected acceleration to a data input unit 131. Instead of the accelerometer 110B, a geomagnetic sensor may be used to detect an attitude of the pen body 100A.

The communication unit 110C is capable of wireless communication with a communication unit 220 of the tablet computer 200. The communication unit 110C may be any device capable of short-range wireless communication, such as Bluetooth Low Energy (trademark). The communication unit 110C may be a device capable of short-range wireless communication by a communication method other than Bluetooth Low Energy. The communication unit 110C acquires an acceleration representing an attitude of the tablet computer 200 from the communication unit 220 of the tablet computer 200 and outputs the acceleration to the data input unit 131.

The writing-pressure sensor 120 detects a pressing force (writing pressure) against a sheet 2 while the user holds the pen-type input device 100 with the finger F. The writing-pressure sensor 120 is connected to the controller 130 and outputs the detected writing pressure to the controller 130. For example, the writing-pressure sensor 120 is interposed in close contact between a pen tip located at the distal end 100A1 and an internal structure of the pen body 100A, at a position close to the distal end 100A1. It is sufficient that the writing-pressure sensor 120 can detect the pressure applied to the pen tip.

The controller 130 has the data input unit 131, a pen category selection unit 132, an angle calculation unit 133, a waveform generation unit 134, a waveform output unit 135, and a memory 136. The waveform generation unit 134 and the waveform output unit 135 are examples of a control unit configured to control drive of the vibration element 150. The memory 136 is an example of a storage unit. The accelerometer 110B, the communication unit 110C (acquisition unit), and the angle calculation unit 133 are examples of a writing-angle detection unit.

The controller 130 is formed by a micro controller unit (MCU) as an example. The controller 130 is a computer including a central processing unit (CPU), a random access memory (RAM), a read only memory (ROM), an input/output interface, an internal bus, and the like. The data input unit 131, the pen category selection unit 132, the angle calculation unit 133, the waveform generation unit 134, and the waveform output unit 135 represent functional blocks of a program executed by the controller 130. The memory 136 functionally represents a memory of the controller 130. Note that the controller 130 is not limited to a computer, and may be formed by, for example, a field programmable gate array (FPGA). A part of the controller 130 (e.g., the waveform output unit 135) may be formed by an FPGA.

The data input unit 131 receives the writing angular velocity and the three-dimensional attitude from the gyroscope sensor 110A, and receives the acceleration of the pen body 100A from the accelerometer 110B. The data input unit 131 receives the acceleration of the tablet computer 200 from the communication unit 110C, and receives the writing pressure from the writing-pressure sensor 120.

The data input unit 131 outputs a pen category input to a switch or the like (not shown) to the pen category selection unit 132. The data input unit 131 outputs the acceleration of the pen body 100A from the accelerometer 110B and outputs the acceleration of the tablet computer 200 from the communication unit 110C to the angle calculation unit 133.

The data input unit 131 integrates the writing angular velocity input from the gyroscope sensor 110A and calculates a writing distance. The data input unit 131 outputs the writing angular velocity, the acceleration of the pen body 100A, the acceleration of the tablet computer 200, the writing distance, the writing pressure, and the three-dimensional attitude to the waveform generation unit 134. Note that the unit of the writing distance is degrees. The writing distance represents a distance of performed writing by an angle.

The pen category selection unit 132 selects a pen category. The pen category is a kind of pen for which the pen-type input device 100 is capable of presenting a tactile sensation of writing by vibrating the vibration element 150 when writing is performed with the pen-type input device 100. Examples of the pen category include a ballpoint pen, a marker pen, a felt-tip pen, a mechanical pencil, and a fountain pen. The pen-type input device 100 is capable of presenting tactile sensations of writing that vary depending on the pen category.

The pen category selection unit 132 selects a pen category in accordance with an operation of a switch or the like at the pen body 100A. The pen category is input from the data input unit 131 to the pen category selection unit 132. The pen category selection unit 132 outputs the selected pen category to the waveform generation unit 134. The user of the pen-type input device 100 may select a pen category by operating a switch provided at the pen body 100A, or may select a pen category by operating the tablet computer 200, input the selected pen category to the pen category selection unit 132 through the communication unit 110C, and output the input pen category to the waveform generation unit 134 by the pen category selection unit 132.

The angle calculation unit 133 calculates a writing angle based on the acceleration of the pen body 100A input from the data input unit 131 and the acceleration of the tablet computer 200. The acceleration of the pen body 100A represents a pen attitude of the pen body 100A. The acceleration of the tablet computer 200 represents a device attitude of the tablet computer 200.

For example, the writing angle is represented by an elevation angle of a pen shaft relative to the operation surface 200A of the tablet computer 200. The elevation angle of the pen shaft may fall within an angular range of 0 to 90 degrees. The angle calculation unit 133 outputs the calculated writing angle to the waveform generation unit 134.

The waveform generation unit 134 generates a pulse height (acceleration of vibration) and a pulse interval (frequency) for generating a drive signal, and outputs the generated pulse height and pulse interval (frequency) to the waveform output unit 135. The waveform generation unit 134 generates a pulse height (acceleration of vibration) and a pulse interval (frequency) based on the writing angular velocity and the writing pressure input from the data input unit 131, the writing angle input from the angle calculation unit 133, and the pen category input from the pen category selection unit 132.

More specifically, the waveform generation unit 134 reads a vibration waveform characteristic parameter for the pen category from the memory 136, and generates a pulse height (acceleration of vibration) by multiplying a value obtained by multiplying the writing angular velocity by a normal random number by the writing pressure, using the read vibration waveform characteristic parameter. Note that a random number other than a normal random number may be used.

The waveform generation unit 134 also reads a vibration waveform characteristic parameter for the pen category from the memory 136, and generates a pulse interval (frequency) based on a value obtained by multiplying the writing angular velocity by a normal random number, using the read vibration waveform characteristic parameter. Accordingly, the generation timing of the vibration is in accordance with the normal random number. Note that a random number other than a normal random number may be used.

The relationship between the pulse height generated by the waveform generation unit 134 and the pen category will be described later with reference to FIGS. 5A and 5B.

The waveform generation unit 134 may correct the writing pressure based on the three-dimensional attitude. The waveform generation unit 134 may calculate the pulse interval between a previous waveform output request and a next waveform output request as an elapsed time based on the current writing velocity and a normal random number. The waveform generation unit 134 may calculate a required writing distance from the writing position where the previous waveform output request was made. The required writing distance is obtained by multiplying the pulse interval, which is determined from the current writing velocity and a normal random number, by the current writing velocity, and may be used for determination.

For example, the waveform output unit 135 is implemented by a finite impulse response (FIR) filter or an infinite impulse response (IIR) filter. When the waveform output unit 135 receives a signal corresponding to a pulse height and a pulse interval (frequency) from the waveform generation unit 134, the waveform output unit 135 applies weighting to and superimposes the currently input signal (current sample signal), the previous sample signal, . . . , and the N-th (N being an integer of 2 or more) previous sample signal. The waveform output unit 135 thereby generates a drive signal having different vibration intensities and intervals corresponding to a pulse train signal (trigger signal) having different pulse heights and pulse intervals, and outputs the drive signal to a driver 140. Moreover, based on information from the pen category selection unit 132, the waveform generation unit 134 reads vibration waveform information on a pen from the memory 136, and the waveform generation unit 134 changes the filter coefficient of the waveform output unit 135.

The memory 136 stores programs and data used by the pen category selection unit 132, the angle calculation unit 133, the waveform generation unit 134, and the waveform output unit 135 to execute processing. The memory 136 stores vibration waveform data corresponding to the pen category selected by the pen category selection unit 132. The memory 136 also stores data representing a normal random number used by the waveform generation unit 134, a relationship between the writing angular velocity and the acceleration of vibration, a relationship between the writing pressure and the acceleration of vibration, a relationship between the writing angular velocity and the generation interval (frequency), and the like. Data stored in the memory 136 other than the above will be described later.

The driver 140 is a drive circuit for the vibration element 150 and drives the vibration element 150 based on a drive signal input from the waveform output unit 135.

For example, a vibration actuator such as a linear resonant actuator (LRA) can be used as the vibration element 150. The vibration element 150 is disposed inside the pen body 100A and is driven by a drive signal, thereby generating vibration in the pen body 100A. By selecting a type of drive signal, vibration is generated in the pen body 100A to realize vibration as if writing is performed with one of various pens.

In the foregoing, an embodiment has been described in which the pen-type input device 100 includes the controller 130 and the vibration element 150. However, the tablet computer 200 may include at least one of the controller 130 or the vibration element 150, and generate vibration on the operation surface 200A by driving the vibration element 150 based on the writing velocity determined by the temporal change of the position where operation is performed by the pen-type input device 100 and the writing pressure.

In such a case, a system including the pen-type input device 100 and the tablet computer 200 can be regarded as an input system. The tablet computer 200 in such an input system is an example of a detection device. Note that the position where the pen-type input device 100 is operated may be detected by a touch panel of the tablet computer 200. The touch panel is an electrostatic sensor capable of detecting the coordinates of the operation position on the operation surface 200A. For example, the writing pressure may be detected by providing the tablet computer 200 with a sensor capable of detecting an operation load applied to the operation surface 200A. In this case, the pen-type input device 100 may include the gyroscope sensor 110A and the writing-pressure sensor 120, and a writing angular velocity and a writing pressure may be transmitted to the controller 130 of the tablet computer 200 through wired communication or wireless communication between the pen-type input device 100 and the tablet computer 200.

This input system may be configured such that the pen-type input device 100 may include the controller 130, the tablet computer 200 may include the vibration element 150, and the controller 130 of the tablet computer 200 may generate a drive signal and transmit the drive signal to the pen-type input device 100 through wired communication or wireless communication between the pen-type input device 100 and the tablet computer 200, thereby driving the vibration element 150. In this case, the writing angular velocity and the writing pressure may be detected by either the pen-type input device 100 or the tablet computer 200.

<Tablet Computer 200>

The tablet computer 200 includes an accelerometer 210 and the communication unit 220. The tablet computer 200 also includes a display, a touch panel, a CPU, a memory, and the like, which are omitted herein.

The accelerometer 210 detects an acceleration generated in the tablet computer 200. The acceleration generated in the tablet computer 200 is acceleration generated in the tablet computer 200 and represents the attitude of the tablet computer 200. A three-axis accelerometer may be used as an example of such an accelerometer 210. The accelerometer 210 outputs the detected acceleration to the CPU, and the CPU outputs the acceleration to the communication unit 220. Instead of the accelerometer 210, a geomagnetic sensor may be used to detect an attitude of the tablet computer 200.

The communication unit 220 is capable of wireless communication with the communication unit 110C of the pen-type input device 100. The communication unit 220 may be any device capable of short-range wireless communication, such as Bluetooth Low Energy (trademark). The communication unit 220 may be a device capable of short-range wireless communication by a communication method other than Bluetooth Low Energy. The communication unit 220 outputs the acceleration of the tablet computer 200 to the communication unit 110C of the pen-type input device 100.

<Measurement of Temporal Changes in Acceleration, Writing Angular Velocity, and Writing Pressure>

Figure 2:
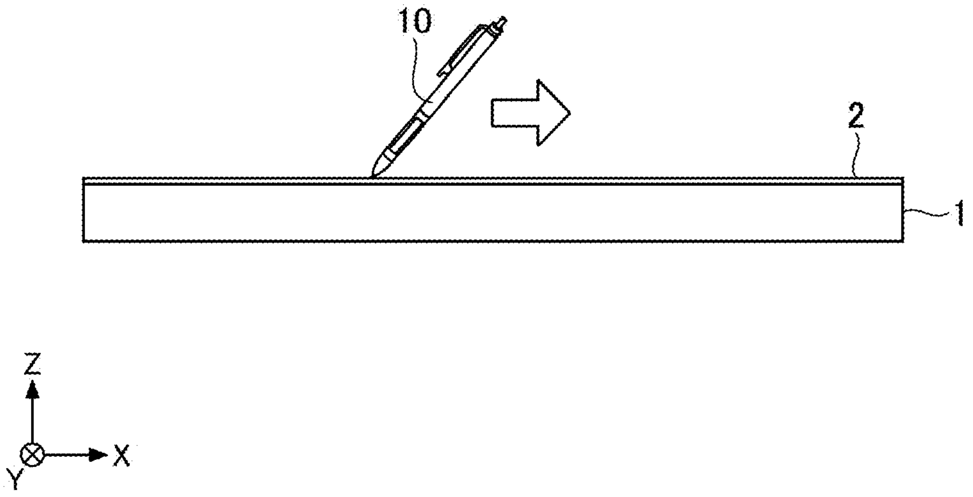
FIG. 2 is a view illustrating an example of a state of measuring temporal changes in acceleration, writing angular velocity, and writing pressure generated in a pen during writing.

FIG. 2 is a view illustrating an example of a state of measuring temporal changes in acceleration, writing angular velocity, and writing pressure generated in a pen 10 during writing. As shown in FIG. 2, a sheet 2 was placed on an upper surface of a flat plate 1. A person in charge of measurement wrote a straight line with the pen 10 in a state where the distal end of the pen 10 was in contact with the surface of the sheet 2 to measure the temporal changes in acceleration, writing angular velocity, and writing pressure generated in the pen 10 during writing.

A ballpoint pen, a marker pen, a felt-tip pen, a mechanical pencil, and a fountain pen were used as examples of the pen 10.

The acceleration is an acceleration of vibration generated in the pen 10 during writing, and an accelerometer was attached to the pen tip of the pen 10 to measure the vibration waveform. The writing angular velocity is an angular velocity generated in the pen 10 during writing, and a gyroscope sensor was attached to the pen 10 to measure the writing angular velocity. Note that the gyroscope sensor is preferably located at a position where the hand does not touch the gyroscope when the pen 10 is gripped by the hand. The gyroscope sensor was attached toward the cap as an example.

The writing pressure is a pressing force applied when the pen tip of the pen 10 presses the sheet 2 during writing. The writing pressure was measured when writing was performed on the flat plate 1 mounted on a load cell (weight sensor).

Figure 3:
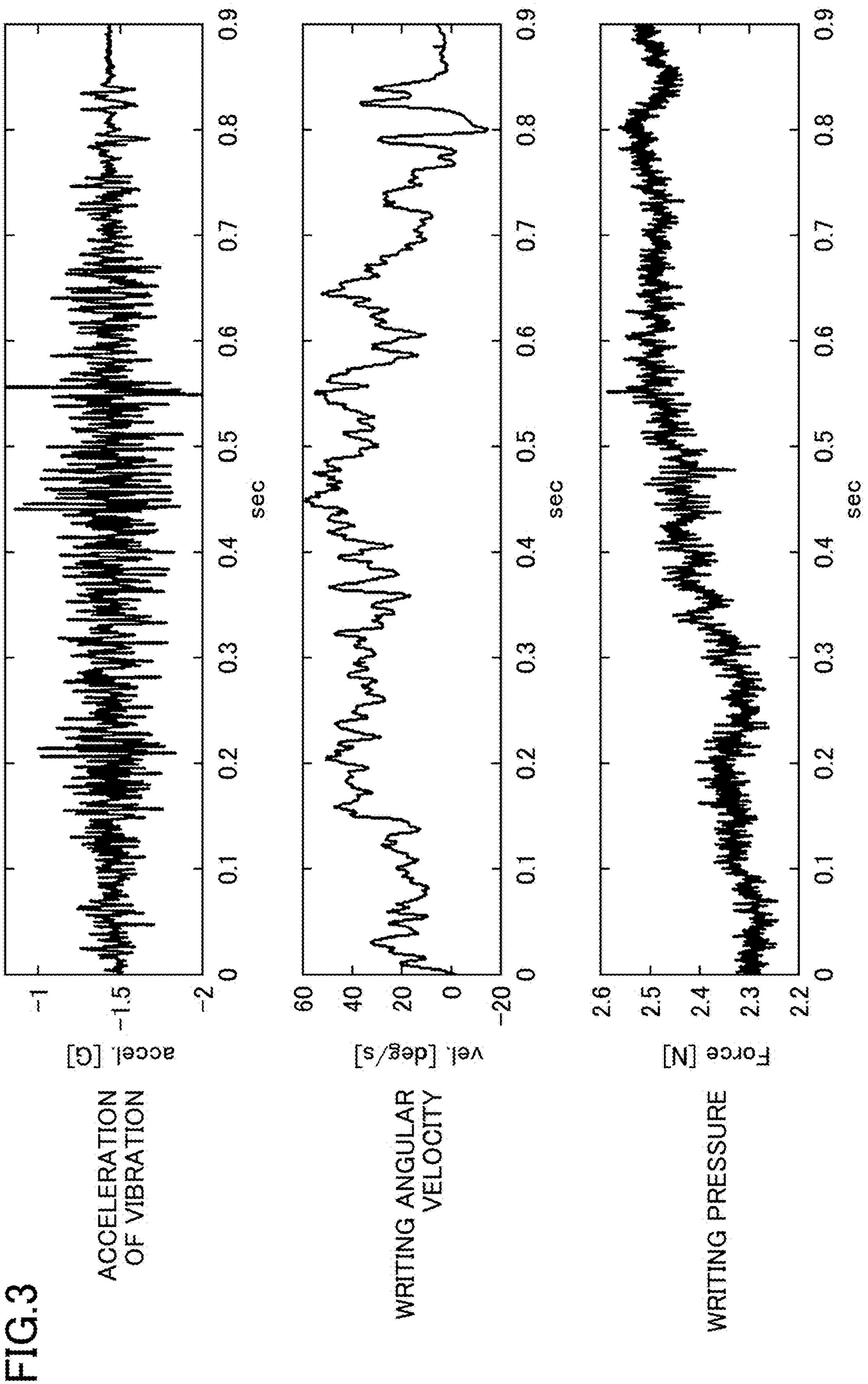
FIG. 3 is a diagram showing examples of the measurement results of temporal changes in acceleration, writing angular velocity, and writing pressure generated in a pen when a straight line is drawn on an ordinary sheet having slight unevenness.

Examples of Measurement Results of Temporal Changes in Acceleration, Writing Angular Velocity, and Writing Pressure FIG. 3 is a diagram showing examples of the measurement results of temporal changes in acceleration, writing angular velocity, and writing pressure generated in the pen 10 when a straight line is drawn on an ordinary sheet having slight unevenness. The acceleration, the writing angular velocity, and the writing pressure shown in FIG. 3 are measured values. The writing angular velocity is an example of a writing velocity.

FIG. 3 shows the results obtained by starting writing with a ballpoint pen stationary at 0 seconds and writing linearly until 0.9 seconds. The temporal changes in acceleration, writing angular velocity, and writing pressure were measured similarly for a mechanical pencil, a felt-tip pen, a marker pen, and a fountain pen.

As a result, the vibration intensity of the writing instrument generated during writing increased for the ballpoint pen and the fountain pen as the writing velocity increased. The vibration intensity of the writing instrument generated during writing was substantially constant for the marker pen, the felt-tip pen, and the mechanical pencil regardless of the writing velocity. The vibration intensity of the writing instrument generated during writing increased for all of the ballpoint pen, the marker pen, the felt-tip pen, the mechanical pencil, and the fountain pen as the writing pressure increased.

<Vibration Characteristics>

FIGS. 4A and 4B show examples of vibration characteristics obtained from the measurement results of temporal changes in acceleration, writing angular velocity, and writing pressure. FIGS. 4A and 4B show a fundamental frequency freq (Hz), a velocity proportional coefficient al (G/deg/sec), a writing-pressure proportional coefficient f1 (G/N), a writing-pressure constant f0 (G), a time-interval proportional coefficient k1 (s/(deg/s)), a time-interval constant k0 (sec), a vibration-intensity standard deviation sigma2, and a time-interval standard deviation sigma1 for the ballpoint pen, the marker pen, the felt-tip pen, the mechanical pencil, and the fountain pen. These coefficients are vibration characteristics obtained from the measurement results of temporal changes in acceleration, writing angular velocity, and writing pressure.

Herein, a pen shaft direction and a writing direction are defined. The pen shaft direction is a direction connecting the distal end 100A1 and the cap 100A2 in FIG. 1A, and is a longitudinal direction of the pen body 100A. The writing direction is a direction in which the distal end 100A1 is moved relative to the operation surface 200A.

FIG. 4A shows the vibration characteristics in the pen shaft direction, and FIG. 4B shows the vibration characteristics in the writing direction. FIGS. 4A and 4B show the measurement results of the fountain pen in a case where the writing direction was lateral and in a case where the writing direction was longitudinal. The lateral writing direction means that writing is performed by moving the pen tip of the fountain pen in a left-right direction. The longitudinal writing direction means that writing is performed by moving the pen tip of the fountain pen in a forward or rearward direction.

The pen-type input device 100 stores the respective coefficients for the ballpoint pen, the marker pen, the felt-tip pen, the mechanical pencil, and the fountain pen shown in FIGS. 4A and 4B in the memory 136 and generates vibration waveforms (see FIGS. 6A and 6B) described later, thereby presenting tactile sensations when writing with the ballpoint pen, the marker pen, the felt-tip pen, the mechanical pencil, and the fountain pen.

The fundamental frequency freq (Hz) is a frequency of a principal component of vibration. The velocity proportional coefficient al (G/deg/sec) is a proportional coefficient indicating a rate at which the vibration intensity increases in accordance with an increase in the writing velocity. The writing-pressure proportional coefficient f1 (G/N) is a proportional coefficient indicating a rate at which the vibration intensity increases in accordance with a load. The writing-pressure constant f0 (G) is a constant added to the writing-pressure proportional coefficient f1 (G/N). The time-interval proportional coefficient k1 (s/(deg/s)) is a proportional coefficient indicating a rate at which the time interval for repeatedly outputting the vibration waveform increases in proportion to an increase in the writing velocity. The time-interval constant k0 (sec) is a constant added to the time interval for repeatedly outputting the vibration waveform. The vibration-intensity standard deviation sigma2 is a standard deviation of the vibration intensity obtained from the vibration characteristics. The time-interval standard deviation sigma1 is a standard deviation of the time interval of the peak of the vibration waveform obtained from the vibration characteristics.

From the vibration characteristics shown in FIGS. 4A and 4B, it was confirmed that the vibration waveform and the vibration characteristics such as the fundamental frequency of the fountain pen differ depending on the writing direction because the pen tip of the fountain pen is split into two parts and the movement of the pen tip is not symmetrical in all writing directions.

It is considered that the vibration feel is felt as the writing feel as the excitation waveform in the pen shaft direction and the writing direction is conveyed to the hand. The shape of the writing tip of the fountain pen is such that a slit for transmitting ink is provided in a thin plate, and appropriate elasticity is generated in the thickness direction of the thin plate. Moreover, the elasticity in the width direction and the thickness direction of the thin plate is different, thereby generating the writing sensation unique to the fountain pen. This is considered that, due to the differences in the elasticity, the vibration waveforms are generated, and the frequency also changes.

In the vibration characteristics shown in FIGS. 4A and 4B, the average of the time-interval constant k0 is 150 Hz to 650 Hz, and the time interval of the pulse becomes shorter (higher frequency) as the writing velocity increases.

Meanwhile, a standard sampling rate of an electrostatic touch panel is 120 Hz, and even a standard sampling rate of a high-speed touch panel is as slow as 240 Hz. Therefore, it is necessary to detect a moving state of the pen tip by the pen-type input device 100, and at least the gyroscope sensor 110A is required.

Furthermore, a state change such that the pen-type input device 100 rotates or is accompanied by parallel movement occurs as an attitude change during writing. Depending on the attitude of the pen-type input device 100, a contribution rate of vibration generated in the pen shaft and that of vibration generated in the writing direction differ.

When the writing angle is large so as to be close to 90 degrees, the vibration of the pen shaft effectively acts, whereas the vibration in the writing direction dominates when the writing angle is small so as to be close to 0 degrees.

Therefore, in order to generate a writing sensation by better vibration feedback, it is important to grasp a writing attitude. For this reason, the writing angle is determined, and a balance is taken between the vibration in the pen shaft direction and the vibration in the writing direction.

The fact that the time interval of the pulse tends to shorten with the writing velocity means that vibration is generated at every certain writing distance. In other words, it is important to grasp the writing distance. By estimating the attitude of the pen-type input device 100 with the gyroscope sensor 110A and the accelerometer 110B (or the geomagnetic sensor) and adding the touch position of the pen tip detected at, for example, every 240 Hz, to correction information, it is possible to present a good writing tactile sensation regardless of the writing attitude.

Figure 5A:
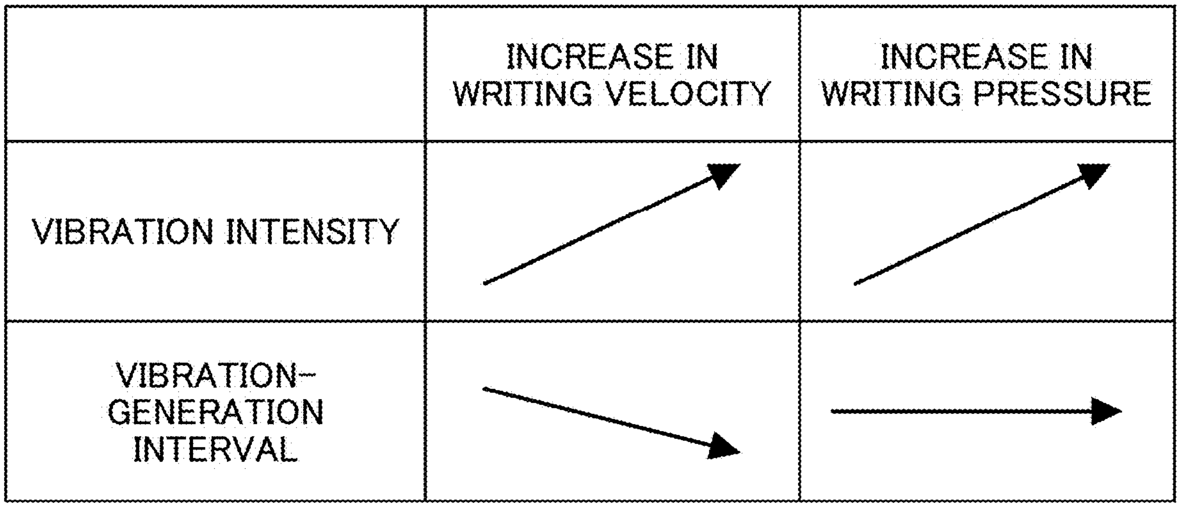
FIG. 5A is a table showing the tendencies of the vibration characteristics indicated in FIGS. 4A and 4B.
Figure 5B:
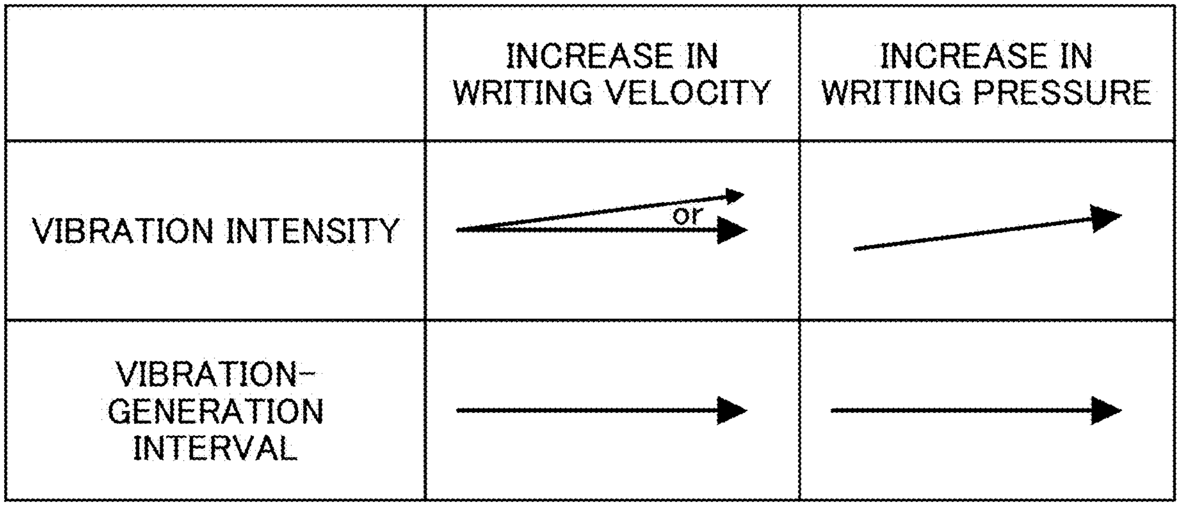
FIG. 5B is a table showing the tendencies of the vibration characteristics indicated in FIGS. 4A and 4B.

FIGS. 5A and 5B are tables showing the tendencies of the vibration characteristics indicated in FIGS. 4A and 4B. FIG. 5A shows a tendency regarding the ballpoint pen, and FIG. 5B shows a tendency regarding the mechanical pencil. FIGS. 5A and 5B show tendencies of vibration intensity and vibration-generation interval in response to an increase in writing velocity or an increase in writing pressure.

As shown in FIG. 5A, there were tendencies for the ballpoint pen in that the vibration intensity increased and the vibration-generation interval was shortened as the writing velocity increased. Moreover, there were tendencies for the ballpoint pen in that the vibration intensity increased and the vibration-generation interval did not change as the writing pressure increased.

As shown in FIG. 5B, there were tendencies for the mechanical pencil in that the vibration intensity did not change or increased at a smaller degree than that of the ballpoint pen and the vibration-generation interval became slowly longer as the writing velocity increased. Moreover, there were tendencies for the mechanical pencil in that the vibration intensity did not change and the vibration-generation interval did not change as the writing pressure increased.

Although not shown in FIGS. 5A and 5B, there were tendencies for the marker pen in that the vibration intensity did not change or increased at a smaller degree than that of the ballpoint pen and the vibration-generation interval did not change as the writing velocity increased.

There were tendencies for the felt-tip pen in that the vibration intensity did not change or increased at a smaller degree than that of the ballpoint pen and the vibration-generation interval became slowly shorter as the writing velocity increased.

There were tendencies for the fountain pen in that the vibration intensity increased and the vibration-generation interval became shorter as the writing velocity increased.

<Generating Vibration Parameters by Waveform Generation Unit 134>

In order to simulate the measurement results shown in FIGS. 4A and 4B and the tendencies of the vibration characteristics shown in FIGS. 5A and 5B, the waveform generation unit 134 updates vibration parameters each time an update time for updating the vibration parameters elapses. The vibration parameters calculated by the waveform generation unit 134 are a time interval Δt1, a target acceleration G1, a target acceleration G2, and a vibration waveform target acceleration G.

The time interval Δt1 is a time interval obtained by multiplying the time-interval proportional coefficient k1 by the writing velocity V and adding the time-interval constant k0 in accordance with the following equation (1), and is set to a value corresponding to the writing velocity V. The time interval Δt1 is used for calculating the update time Δt.

$$\Delta t1 = V \times k1 + k0 \tag{1}$$

The update time Δt can be obtained by substituting the time interval Δt1 and the time-interval standard deviation sigma1 into a normal random number generation function normrnd in accordance with the following equation (2).

$$\Delta t = normrnd(\Delta t1, \text{sigma1}) \tag{2}$$

Instead of the update time Δt, an update distance ΔL obtained by converting the update time Δt into a distance that the pen tip has moved may be used. The update distance ΔL is expressed by the following equation (2A).

$$\Delta L = \Delta t \times V \tag{2A}$$

The target acceleration G1 is obtained by multiplying the velocity proportional coefficient a1 by the writing velocity V and adding a constant a0 in accordance with the following equation (3). The target acceleration G1 is a target acceleration corresponding to the writing velocity V.

$$G1 = a1 \times V + a0 \tag{3}$$

The target acceleration G2 is obtained by multiplying the writing-pressure proportional coefficient f1 by the writing pressure F and adding the writing-pressure constant f0 in accordance with the following equation (4). The target acceleration G2 is a target acceleration corresponding to the writing pressure F.

$$G2 = f1 \times f + f0 \tag{4}$$

The vibration waveform target acceleration G can be obtained by substituting the sum of the target accelerations G1 and G2 and the vibration-intensity standard deviation sigma2 into the normal random number generation function normrnd in accordance with the following equation (5).

$$\Delta t = normrnd(G1 + G2, \text{sigma2}) \tag{5}$$

The update time Δt obtained by the equation (2) is a pulse interval (frequency). The vibration waveform target acceleration G obtained by the equation (5) is a pulse height.

<Relationship Between Pen Category and Pulse Height Generated by Waveform Generation Unit 134>

<Setting Vibration Intensity Based on Writing Angle V>

When a first pen category is a ballpoint pen or a fountain pen and a first velocity proportional coefficient is the velocity proportional coefficient a1 for the ballpoint pen or the fountain pen, the waveform generation unit 134 generates a first vibration waveform for the ballpoint pen or the fountain pen based on the writing angle V as follows.

When the first pen category is selected by the pen category selection unit 132, the waveform generation unit 134 increases an amplitude of the first vibration waveform in accordance with the first velocity proportional coefficient and the writing velocity V.

When a second pen category is a marker pen, a felt-tip pen, or a mechanical pencil and a second velocity proportional coefficient is the velocity proportional coefficient al for the marker pen, the felt-tip pen, or the mechanical pencil, the waveform generation unit 134 generates a second vibration waveform for each of the marker pen, the felt-tip pen, and the mechanical pencil as follows.

When the second pen category is selected by the pen category selection unit 132, the waveform generation unit 134 increases an amplitude of the second vibration waveform in accordance with the second velocity proportional coefficient, which is smaller than the first velocity proportional coefficient, and the writing velocity V.

<Setting Vibration Intensity Based on Writing Pressure F>

When the first pen category is a ballpoint pen and a first writing-pressure proportional coefficient is the writing-pressure proportional coefficient f1 for the ballpoint pen, the waveform generation unit 134 generates a first vibration waveform for the ballpoint pen based on the writing pressure F as follows.

When the first pen category is selected by the pen category selection unit 132, the waveform generation unit 134 increases an amplitude of the first vibration waveform in accordance with the first writing-pressure proportional coefficient and the writing pressure F.

When the second pen category is a mechanical pencil and a second writing-pressure proportional coefficient is the writing-pressure proportional coefficient f1 for the mechanical pencil, the waveform generation unit 134 generates a second vibration waveform for the mechanical pencil based on the writing pressure F as follows.

When the second pen category is selected by the pen category selection unit 132, the waveform generation unit 134 increases an amplitude of the second vibration waveform in accordance with the second writing-pressure proportional coefficient, which is smaller than the first writing-pressure proportional coefficient, and the writing pressure F.

<Setting Update Time at Based on Writing Angle V>

When the first pen category is a ballpoint pen, a felt-tip pen, or a fountain pen, the first time-interval proportional coefficient is a time-interval proportional coefficient k1 for the ballpoint pen, the felt-tip pen, or the fountain pen, and the first time interval is an update time Δt for the ballpoint pen, the felt-tip pen, or the fountain pen, the waveform generation unit 134 generates a first time interval for the ballpoint pen, the felt-tip pen, or the fountain pen based on the writing angle V as follows.

When the first pen category is selected by the pen category selection unit 132, the waveform generation unit 134 shortens the first time interval in accordance with the first time-interval proportional coefficient and the writing velocity.

When the second pen category is a marker pen or a mechanical pencil, the second time-interval proportional coefficient is a time-interval proportional coefficient k1 for the marker pen or the mechanical pencil, and a second time interval is an update time Δt for the marker pen or the mechanical pencil, the waveform generation unit 134 generates a second time interval for the marker pen or the mechanical pencil based on the writing angle V as follows.

When the second pen category is selected by the pen category selection unit 132, the waveform generation unit 134 lengthens the second time interval in accordance with the second time-interval proportional coefficient, which is larger than the first time-interval proportional coefficient, and the writing velocity.

<Vibration Waveforms in Pen Shaft Direction and Writing Direction>

The first vibration waveform has a first pen shaft direction vibration waveform and a first writing direction vibration waveform. The first pen shaft direction vibration waveform causes the vibration element 150 to generate vibration in the pen shaft direction of the pen body 100A, and the first writing direction vibration waveform causes the vibration element 150 to generate vibration in the writing direction. The second vibration waveform has a second pen shaft direction vibration waveform and a second writing direction vibration waveform. The second pen shaft direction vibration waveform causes the vibration element 150 to generate vibration in the pen shaft direction, and the second writing direction vibration waveform causes the vibration element 150 to generate vibration in the writing direction. The first writing direction vibration waveform is an example of a first different direction vibration waveform which causes the vibration element 150 to generate vibration in a direction different from the pen shaft direction. The second writing direction vibration waveform is an example of a second different direction vibration waveform which causes the vibration element 150 to generate vibration in a direction different from the pen shaft direction.

The waveform generation unit 134 increases the ratio between the first pen shaft direction vibration waveform and the second pen shaft direction vibration waveform to be larger than the ratio between the first different direction vibration waveform and the second different direction vibration waveform as the writing angle increases. The waveform generation unit 134 decreases the ratio between the first pen shaft direction vibration waveform and the second pen shaft direction vibration waveform to be smaller than the ratio between the first different direction vibration waveform and the second different direction vibration waveform as the writing angle decreases.

When the vibration waveform is a unit vibration waveform, the first vibration waveform corresponds to a first unit vibration waveform, and the second vibration waveform corresponds to a second unit vibration waveform. In this case, the first unit vibration waveform has a first pen shaft direction unit vibration waveform and a first writing direction unit vibration waveform. The first pen shaft direction unit vibration waveform causes the vibration element 150 to generate vibration in the pen shaft direction of the pen body 100A, and the first writing direction unit vibration waveform causes the vibration element 150 to generate vibration in the writing direction. The second unit vibration waveform has a second pen shaft direction unit vibration waveform and a second writing direction unit waveform. The second pen shaft unit vibration waveform causes the vibration element 150 to generate vibration in the pen shaft direction, and the second writing direction unit vibration waveform causes the vibration element 150 to generate vibration in the writing direction. The first writing direction unit vibration waveform is an example of the first different direction unit vibration waveform which causes the vibration element 150 to generate vibration in a direction different from the pen shaft direction. The second writing direction unit vibration waveform is an example of the second different direction unit vibration waveform which causes the vibration element 150 to generate vibration in a direction different from the pen shaft direction.

<Vibration Waveform Corresponding to Pen Category>

FIGS. 6A to 6D are graphs showing examples of vibration waveforms used to drive the vibration element 150 for the pen-type input device 100 to present vibrations during writing with a ballpoint pen, a marker pen, a felt-tip pen, a mechanical pencil, and a fountain pen. The vibration waveforms shown in FIGS. 6A to 6D are examples of the vibration waveforms generated by the waveform generation unit 134 in accordance with the above-described first pen category and second pen category. Moreover, the vibration waveforms shown in FIGS. 6A to 6D are vibration response waveforms represented by the fundamental frequency freq or simple sine waveforms designated by the fundamental frequency freq.

The vibration waveforms shown in FIGS. 6A to 6D are stored in the memory 136 (see FIG. 1B) and selected by the waveform generation unit 134 in accordance with the pen category selected by the pen category selection unit 132.

Figure 6A:
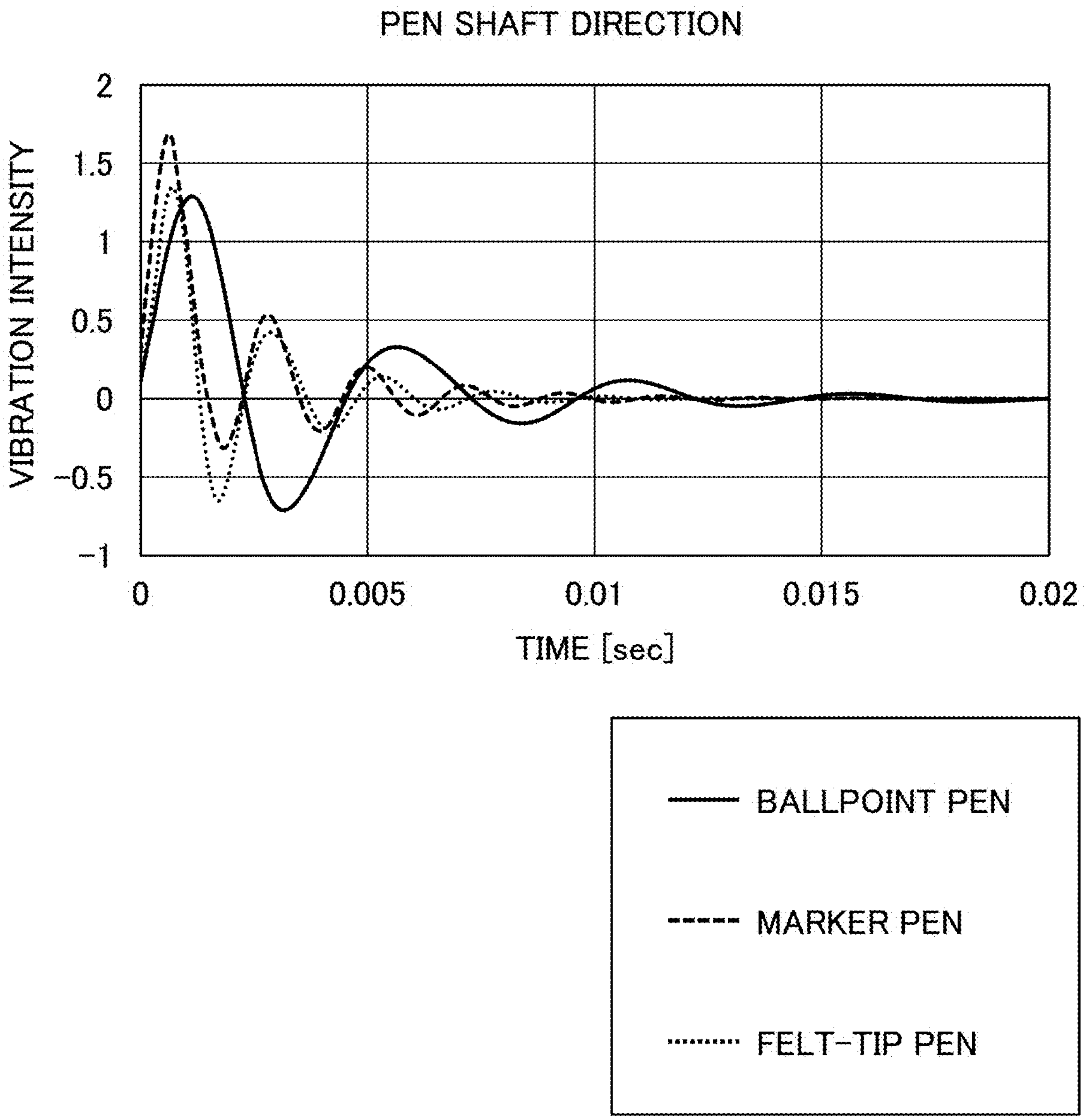
FIG. 6A is a graph showing examples of vibration waveforms used to drive a vibration element for the pen-type input device according to the embodiment to simulate vibrations during writing with a ballpoint pen, a marker pen, a felt-tip pen, a mechanical pencil, and a fountain pen.
Figure 6B:
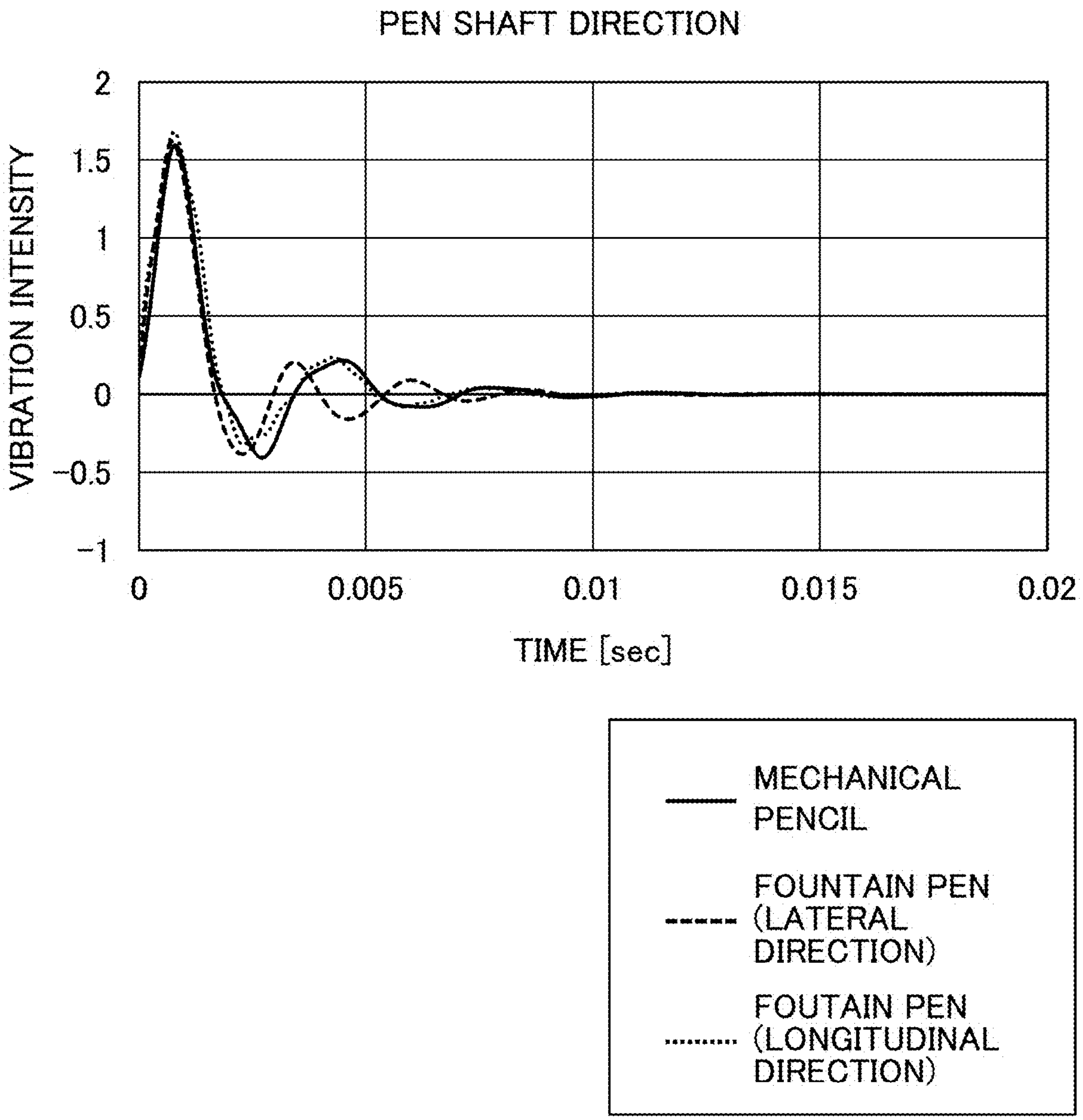
FIG. 6B is a graph showing examples of vibration waveforms used to drive the vibration element for the pen-type input device according to the embodiment to simulate vibrations during writing with a ballpoint pen, a marker pen, a felt-tip pen, a mechanical pencil, and a fountain pen.

FIG. 6A shows examples of vibration waveforms for generating vibrations corresponding to the ballpoint pen, the marker pen, and the felt-tip pen in the pen shaft direction. FIG. 6B shows examples of vibration waveforms for generating vibrations corresponding to the mechanical pencil and the fountain pen (in the lateral direction and the longitudinal direction) in the pen shaft direction.

Figure 6C:
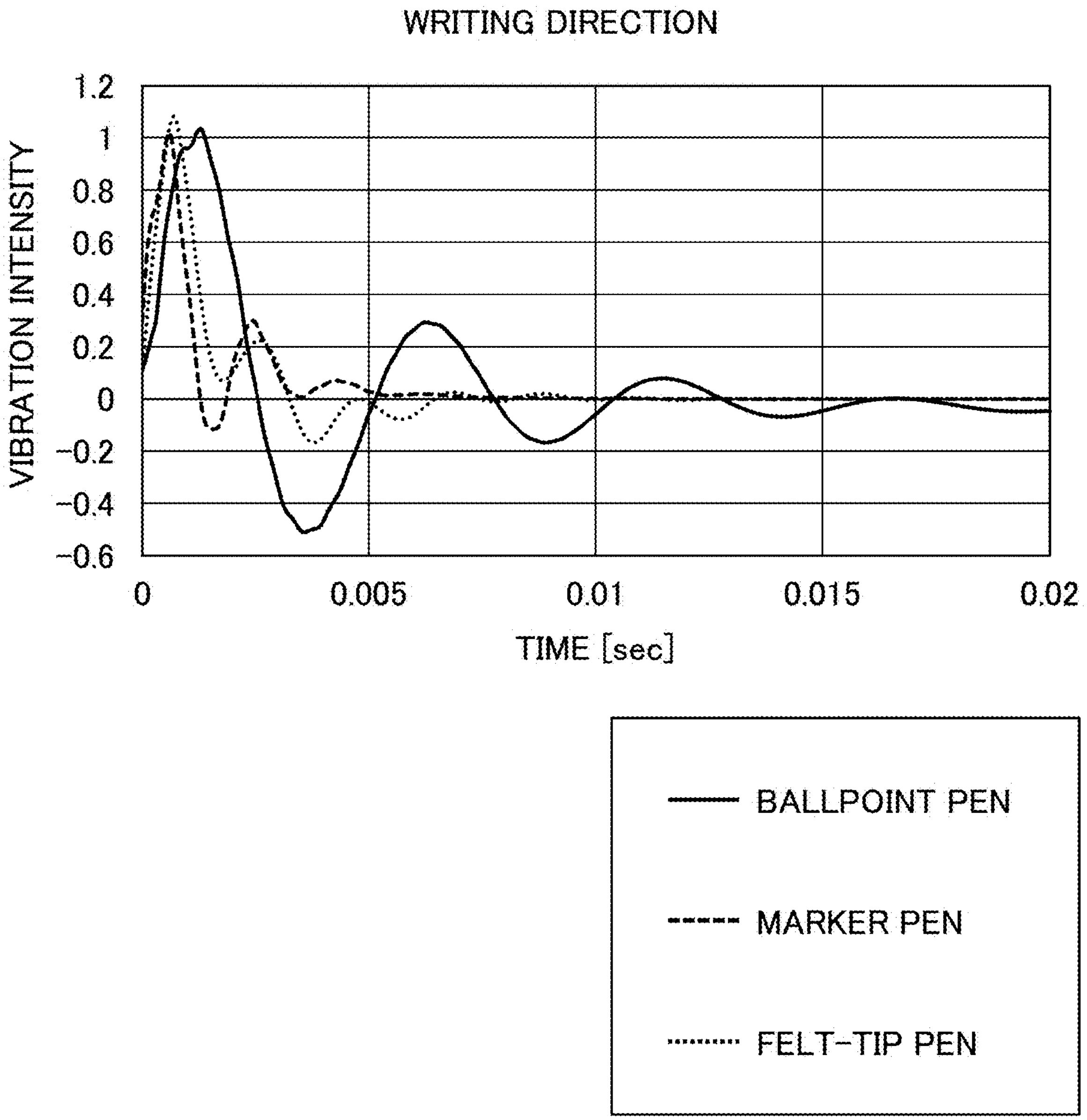
FIG. 6C is a graph showing examples of vibration waveforms used to drive the vibration element for the pen-type input device according to the embodiment to simulate vibrations during writing with a ballpoint pen, a marker pen, a felt-tip pen, a mechanical pencil, and a fountain pen.
Figure 6D:
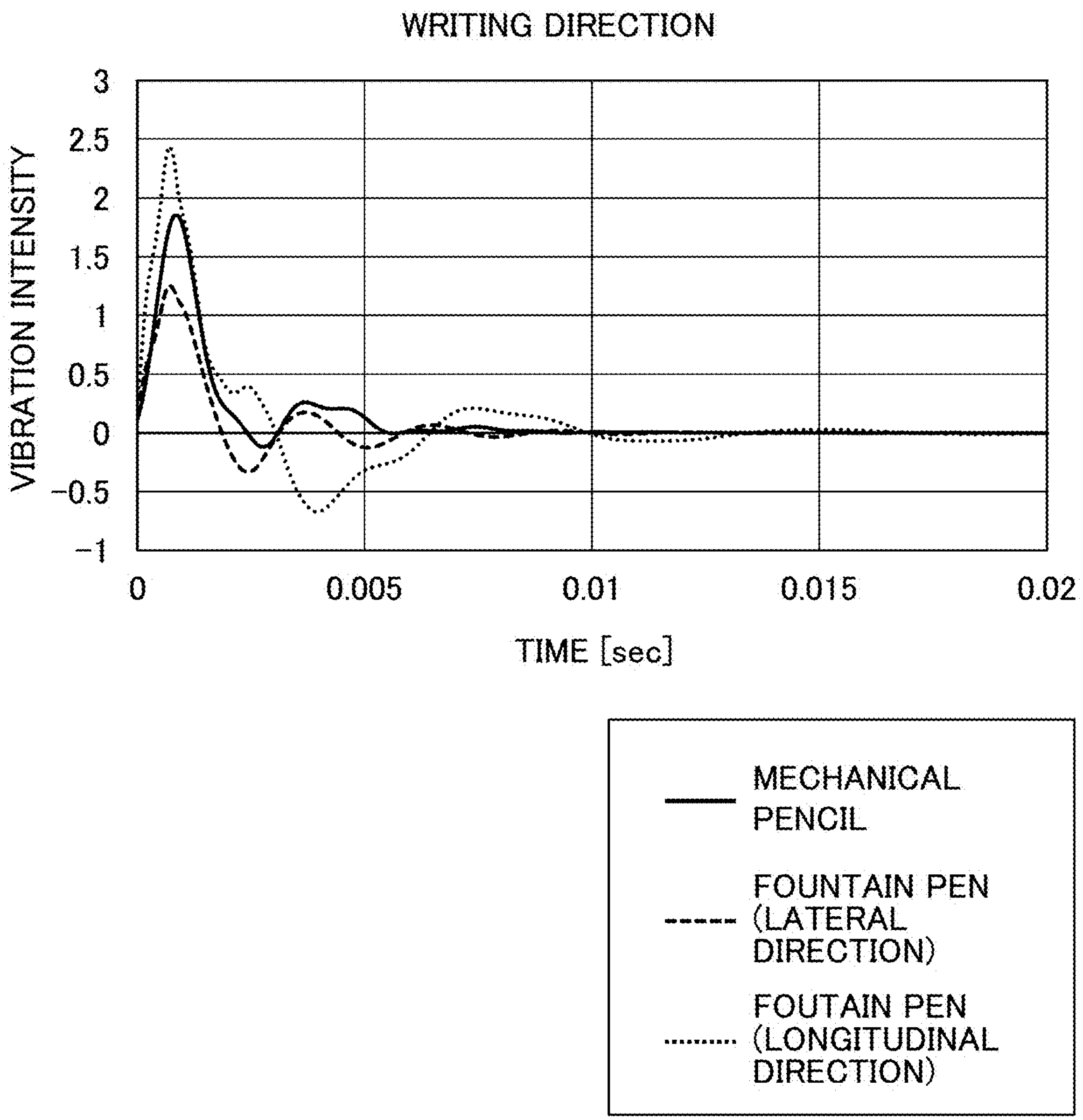
FIG. 6D is a graph showing examples of vibration waveforms used to drive the vibration element for the pen-type input device according to the embodiment to simulate vibrations during writing with a ballpoint pen, a marker pen, a felt-tip pen, a mechanical pencil, and a fountain pen.

FIG. 6C shows examples of vibration waveforms for generating vibrations corresponding to the ballpoint pen, the marker pen, and the felt-tip pen in the writing direction. FIG. 6D shows examples of vibration waveforms for generating vibrations corresponding to the mechanical pencil and the fountain pen (in the lateral direction and the longitudinal direction) in the writing direction.

The waveform of one cycle including a first pulse among the vibration waveforms shown in FIGS. 6A to 6D is a unit vibration waveform. The unit vibration waveform is a vibration waveform of one cycle which can generate a vibration waveform as shown in FIGS. 6A to 6D by repeatedly outputting the unit vibration waveform. The waveform of the unit vibration waveform can be set by setting the coefficients (see FIGS. 4A and 4B) from the fundamental frequency freq (Hz) to the time-interval standard deviation sigma1 for any of the ballpoint pen, the marker pen, the felt-tip pen, the mechanical pencil, or the fountain pen.

Herein, description will be given of an embodiment in which each coefficient in FIGS. 4A and 4B is applied to a unit vibration waveform (e.g., a SIN vibration waveform) based on the fundamental frequency, but vibration waveforms (damped vibration waveforms) generated by various pens as shown in FIGS. 6A to 6D may be used. These substantially SIN waveforms and damped vibration waveforms generate vibration waveforms by changing a coefficient of, for example, an FIR filter applied to the waveform output unit 135 which generates response waveforms shown in FIGS. 6A to 6D in response to a unit pulse input.

<Measurement Results of Accelerations of Vibrations Generated in Pen Body 100A>

Figure 7:
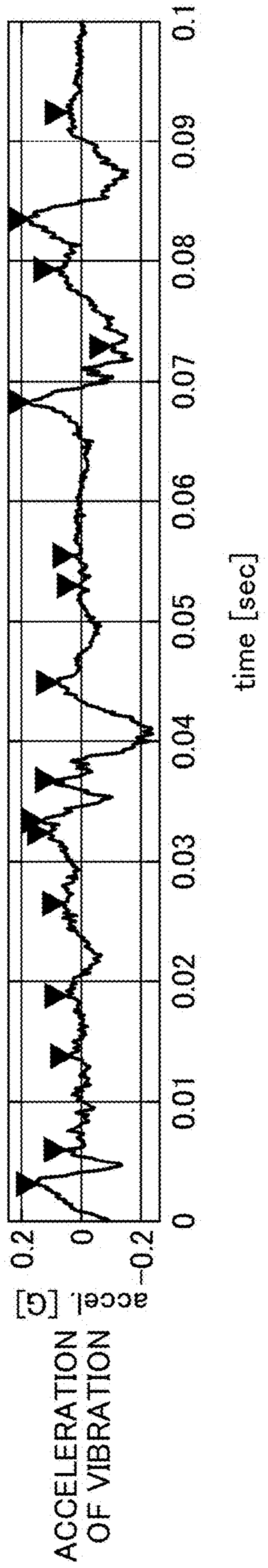
FIG. 7 is a graph showing an example of a measurement result of acceleration of vibration generated in a pen body when the pen-type input device according to the embodiment repeatedly outputs a unit vibration waveform.

FIG. 7 is a graph showing an example of a measurement result of the acceleration of vibration generated in the pen body 100A by repeatedly outputting a unit vibration waveform. In FIG. 7, the horizontal axis represents time, and the vertical axis represents an acceleration of vibration generated in the pen body 100A. A time point indicated by an inverted triangle in FIG. 7 represents timing for outputting a unit vibration waveform.

The vibration waveform corresponding to the pen category selected by the pen category selection unit 132 is read out from the memory 136 by the waveform generation unit 134, and a drive signal corresponding to the selected vibration waveform is generated by the waveform output unit 135, thereby driving the vibration element 150. In this case, for example, the waveform generation unit 134 repeatedly outputs a unit vibration waveform to the waveform output unit 135 at the time points indicated by the inverted triangles in FIG. 7. The waveform output unit 135 repeatedly outputs a drive signal corresponding to the unit vibration waveform based on the unit vibration waveform repeatedly input from the waveform generation unit 134. Accordingly, vibration corresponding to the pen category is generated in the pen body 100A, and a tactile sensation corresponding to the pen category is presented to the hand of the user.

The acceleration of vibration generated in the pen body 100A was measured based on the vibration waveform of each pen category of the ballpoint pen, the marker pen, the felt-tip pen, the mechanical pencil, and the fountain pen, and it was confirmed that a standard deviation with a variation range of about 0.42 times the average pulse interval was observed in all the pen categories. The deviation distribution followed a normal random pattern. The time interval constant k0 was about 1.6 msec to about 6.8 msec, which was about 625 Hz to about 147 Hz when converted into a frequency.

<Flowchart>

Figure 8:
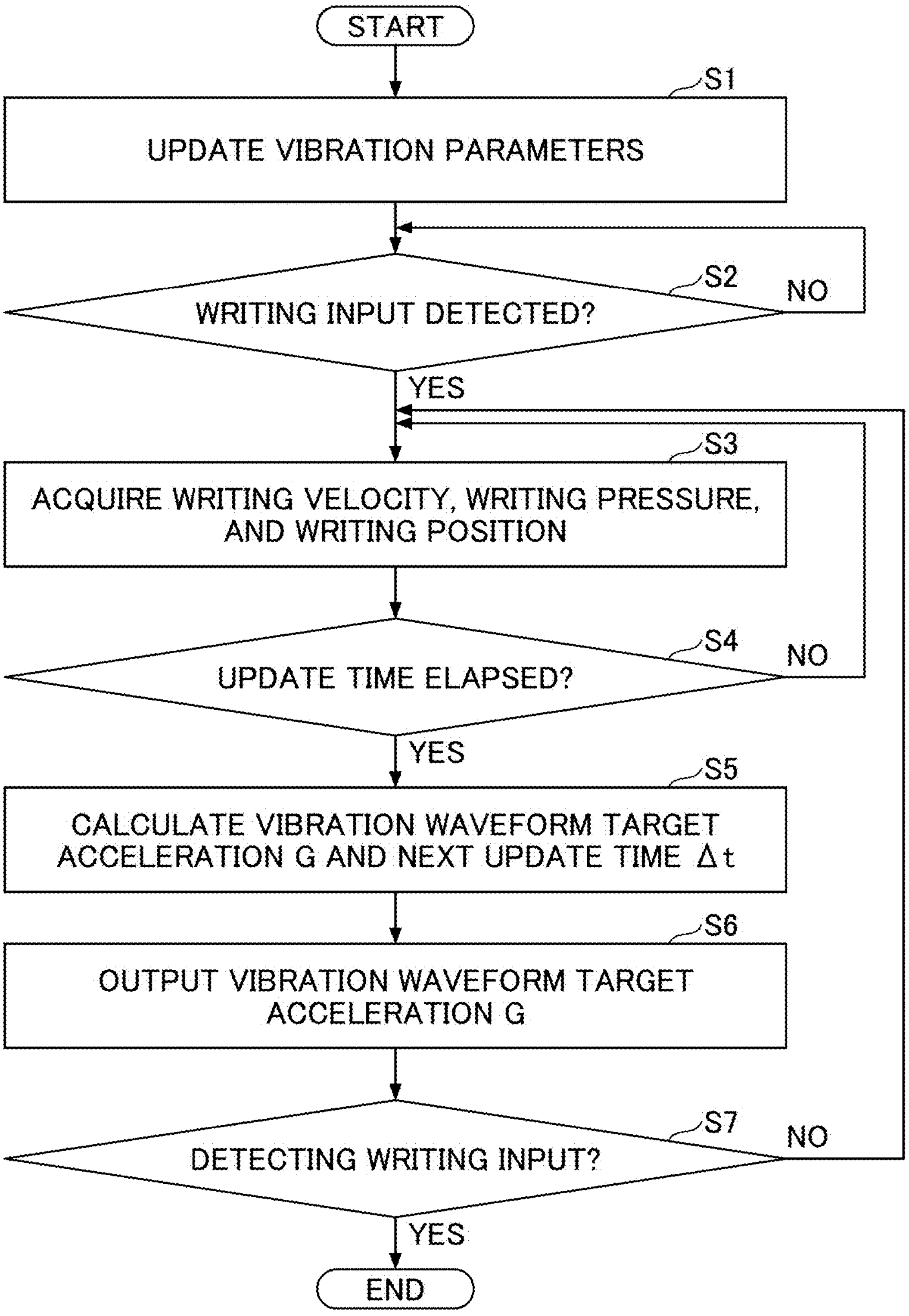
FIG. 8 is a flowchart illustrating an example of processing executed by a waveform generation unit of the pen-type input device according to the embodiment.

FIG. 8 is a flowchart illustrating an example of processing executed by the waveform generation unit 134 of the pen-type input device 100.

When the processing is started, the waveform generation unit 134 updates the vibration parameters (Step S1). Updating the vibration parameters means generating the vibration parameters at each update time Δt. The vibration parameters are the time interval Δt1, the target acceleration G1, the target acceleration G2, and the vibration waveform target acceleration G.

The waveform generation unit 134 determines whether the writing input has been detected (Step S2). The detection of the writing input may be determined based on the fact that the writing pressure detected by the writing-pressure sensor 120 has reached a predetermined threshold or more, or based on the fact that the touch panel of the tablet computer 200 has detected the coordinates of the pen tip. When the writing input is determined to be not detected (S2: NO), the waveform generation unit 134 repeatedly executes the processing of Step S2 until the writing input is detected.

When the writing input is determined to be detected (S2: YES), the waveform generation unit 134 acquires the writing velocity V, the writing pressure F, and the writing position (Step S3). The writing velocity V and the writing pressure F may be acquired from the gyroscope sensor 110A and the writing-pressure sensor 120. Since the writing position is the coordinates of the pen tip detected by the touch panel of the tablet computer 200, the writing position can be acquired from the tablet computer 200.

The waveform generation unit 134 determines whether or not the update time Δt has elapsed (Step S4).

When the update time Δt is determined to be not elapsed (S4: NO), the waveform generation unit 134 returns to Step S3 in the flow.

When the update time Δt is determined to be elapsed (S4: YES), the waveform generation unit 134 calculates the vibration waveform target acceleration G and the next update time Δt (Step S5).

The waveform generation unit 134 outputs the vibration waveform target acceleration G (Step S6). Accordingly, the vibration waveform target acceleration G is output, which is obtained by synthesizing any one of the unit vibration waveforms in the pen shaft direction shown in FIGS. 6A and 6B and any one of the unit vibration waveforms in the writing direction shown in FIGS. 6C and 6D at a ratio corresponding to the writing angle.

The waveform generation unit 134 determines whether the writing input is being detected (Step S7).

When the writing input is determined to be being detected (Step S7: YES), the waveform generation unit 134 ends a series of processings (END). The waveform generation unit 134 restarts the flow from Step S1.

When the writing input is determined to be not being detected (S7: NO), the waveform generation unit 134 returns to Step S3 in the flow. This is to acquire again the writing velocity V, the writing pressure F, and the writing position since the writing input is not performed.

Effects

A pen-type input device 100 includes: a pen body 100A; a vibration element 150 accommodated inside the pen body 100A; a pen category selection unit 132 configured to select a first pen category or a second pen category; a memory 136 configured to store a first vibration waveform and a second vibration waveform, the first vibration waveform corresponding to the first pen category, and the second vibration waveform corresponding to the second pen category; a control unit (the waveform generation unit 134 and the waveform output unit 135) configured to perform drive control of the vibration element 150 based on the first vibration waveform corresponding to the first pen category or the second vibration waveform corresponding to the second pen category, the first pen category or the second pen category being selected by the pen category selection unit 132; and a gyroscope sensor 110A configured to detect a writing velocity of the pen body 100A, in which the control unit (the waveform generation unit 134 and the waveform output unit 135) is configured to: drive the vibration element 150 so as to increase a vibration intensity by a first degree as the writing velocity increases, when the first pen category is selected by the pen category selection unit 132, and drive the vibration element 150 so as to increase the vibration intensity by a second degree, which is smaller than the first degree, as the writing velocity increases, or drive the vibration element 150 with the vibration intensity of a constant level regardless of the writing velocity, when the second pen category is selected by the pen category selection unit 132. Since a different relationship between the writing velocity and the vibration intensity can be reproduced depending on the pen category, it is possible to enhance the reproducibility of the tactile sensation in writing for each pen category and easily recognize the difference between the pen categories.

Therefore, it is possible to provide the pen-type input device 100 capable of presenting a tactile sensation of actual writing.

The control unit (the waveform generation unit 134 and the waveform output unit 135) may be configured to: drive the vibration element 150 so as to increase an amplitude of the first vibration waveform in accordance with a first velocity proportional coefficient and the writing velocity, when the first pen category is selected by the pen category selection unit 132, and drive the vibration element 150 so as to increase an amplitude of the second vibration waveform in accordance with a second velocity proportional coefficient, which is smaller than the first velocity proportional coefficient, and the writing velocity, when the second pen category is selected by the pen category selection unit 132. Thus, by increasing the amplitude of the first vibration waveform in accordance with the first velocity proportional coefficient and the writing velocity and by increasing the amplitude of the second vibration waveform in accordance with the second velocity proportional coefficient and the writing velocity, it is possible to enhance the reproducibility of the tactile sensation in writing for each pen category and easily recognize the difference between the pen categories.

A pen-type input device 100 includes: a pen body 100A; a vibration element 150 accommodated inside the pen body 100A; a pen category selection unit 132 configured to select a first pen category or a second pen category; a memory 136 configured to store a first vibration waveform and a second vibration waveform, the first vibration waveform corresponding to the first pen category, and the second vibration waveform corresponding to the second pen category; a control unit (the waveform generation unit 134 and the waveform output unit 135) configured to perform drive control of the vibration element 150 based on the first vibration waveform corresponding to the first pen category or the second vibration waveform corresponding to the second pen category, the first pen category or the second pen category being selected by the pen category selection unit 132; and a writing-pressure sensor 120 configured to detect a writing pressure of the pen body 100A, in which the control unit (the waveform generation unit 134 and the waveform output unit 135) is configured to: drive the vibration element 150 so as to increase a vibration intensity by a first degree as the writing pressure increases, when the first pen category is selected by the pen category selection unit 132, and drive the vibration element 150 so as to increase the vibration intensity by a second degree, which is smaller than the first degree, as the writing pressure increases, or drive the vibration element 150 with the vibration intensity of a constant level regardless of the writing pressure, when the second pen category is selected by the pen category selection unit 132. Since a different relationship between the writing pressure and the vibration intensity can be reproduced depending on the pen category, it is possible to enhance the reproducibility of the tactile sensation in writing for each pen category and easily recognize the difference between the pen categories.

Therefore, it is possible to provide the pen-type input device 100 capable of presenting a tactile sensation of actual writing.

The control unit (the waveform generation unit 134 and the waveform output unit 135) may be configured to: drive the vibration element 150 so as to increase an amplitude of the first vibration waveform in accordance with a first writing-pressure proportional coefficient and the writing pressure, when the first pen category is selected by the pen category selection unit 132, and drive the vibration element 150 so as to increase an amplitude of the second vibration waveform in accordance with a second writing-pressure proportional coefficient, which is smaller than the first writing-pressure proportional coefficient, and the writing pressure, when the second pen category is selected by the pen category selection unit 132. Thus, by increasing the amplitude of the first vibration waveform in accordance with the first writing-pressure proportional coefficient and the writing pressure and by increasing the amplitude of the second vibration waveform in accordance with the second writing-pressure proportional coefficient and the writing pressure, it is possible to enhance the reproducibility of the tactile sensation in writing for each pen category and easily recognize the difference between the pen categories.

The first vibration waveform may have a first pen shaft direction vibration waveform and a first different direction vibration waveform, the first pen shaft direction vibration waveform being capable of causing the vibration element 150 to generate vibration in a pen shaft direction of the pen body 100A, and the first different direction vibration waveform being capable of causing the vibration element 150 to generate vibration in a direction different from the pen shaft direction. The second vibration waveform may have a second pen shaft direction vibration waveform and a second different direction vibration waveform, the second pen shaft direction vibration waveform being capable of causing the vibration element 150 to generate vibration in the pen shaft direction, and the second different direction vibration waveform being capable of causing the vibration element 150 to generate vibration in the direction different from the pen shaft direction. By using the vibration in the pen shaft direction and the vibration in the direction different from the pen shaft direction, it is possible to provide the pen-type input device 100 capable of presenting a further tactile sensation of actual writing.

The pen-type input device may further include a writing-angle detection unit configured to detect a writing angle between the pen body 100A and a writing surface of the tablet computer 200, the writing surface being a writing target, in which the control unit (the waveform generation unit 134 and the waveform output unit 135) may be configured to: increase a ratio between the first pen shaft direction vibration waveform and the second pen shaft direction vibration waveform to be larger than a ratio between the first different direction vibration waveform and the second different direction vibration waveform as the writing angle increases, and decrease the ratio between the first pen shaft direction vibration waveform and the second pen shaft direction vibration waveform to be smaller than the ratio between the first different direction vibration waveform and the second different direction vibration waveform as the writing angle decreases. By adjusting the ratio between the vibration in the pen shaft direction and the vibration in the direction different from the pen shaft direction, it is possible to reproduce a different tactile sensation in accordance with a difference in writing angles and to provide the pen-type input device 100 capable of presenting a further tactile sensation of actual writing.

The direction different from the first direction may be a direction in which writing is performed with the pen body 100A. By adjusting the ratio between the vibration in the pen shaft direction and the vibration in the writing direction in accordance with the writing angle, it is possible to provide the pen-type input device 100 capable of presenting a further tactile sensation of actual writing.

The writing-angle detection unit may include: an accelerometer 110B configured to detect a pen attitude of the pen body 100A, a communication unit 110C (acquisition unit) configured to acquire a device attitude of the tablet computer 200 from the tablet computer 200, and an angle calculation unit 133 configured to calculate the writing angle based on the pen attitude and the device attitude, the pen attitude being detected by the accelerometer 110B, and the device attitude being acquired by the communication unit 110C (acquisition unit). By adjusting the ratio between the vibration in the pen shaft direction and the vibration in the direction different from the pen shaft direction in accordance with the writing angle obtained by accurate calculation based on the pen attitude and the device attitude, it is possible to reproduce a different tactile sensation in accordance with a difference in writing angles and to provide the pen-type input device 100 capable of presenting a further tactile sensation of actual writing.

A pen-type input device 100 includes: a pen body 100A; a vibration element 150 accommodated inside the pen body 100A; a pen category selection unit 132 configured to select a first pen category or a second pen category; a memory 136 configured to store a first unit vibration waveform and a second unit vibration waveform, the first unit vibration waveform corresponding to the first pen category, and the second unit vibration waveform corresponding to the second pen category; a control unit (the waveform generation unit 134 and the waveform output unit 135) configured to perform drive control of the vibration element 150 by repeatedly outputting the first unit vibration waveform corresponding to the first pen category or the second unit vibration waveform corresponding to the second pen category, the first pen category or the second pen category being selected by the pen category selection unit 132; and a gyroscope sensor 110A configured to detect a writing velocity of the pen body 100A, in which the control unit (the waveform generation unit 134 and the waveform output unit 135) is configured to: drive the vibration element 150 so as to shorten a first time interval for outputting the first unit vibration waveform as the writing velocity increases, when the first pen category is selected by the pen category selection unit 132, and drive the vibration element 150 so as to shorten a second time interval for outputting the second unit vibration waveform as the writing velocity increases, or drive the vibration element 150 at the second time interval of a constant level regardless of the writing velocity, when the second pen category is selected by the pen category selection unit 132, and the second time interval is longer than the first time interval. Since a different relationship between the writing velocity and the time interval (the first time interval or the second time interval) for outputting the unit vibration waveform (the first unit vibration waveform and the second unit vibration waveform) can be reproduced depending on the pen category, it is possible to enhance the reproducibility of the tactile sensation in writing for each pen category and easily recognize the difference between the pen categories.

Therefore, it is possible to provide the pen-type input device 100 capable of presenting a tactile sensation of actual writing.

The control unit (the waveform generation unit 134 and the waveform output unit 135) may be configured to: shorten the first time interval in accordance with a first time-interval proportional coefficient and the writing velocity to drive the vibration element 150, when the first pen category is selected by the pen category selection unit 132, and shorten the second time interval in accordance with a second time-interval proportional coefficient, which is larger than the first time-interval proportional coefficient, and the writing velocity to drive the vibration element 150, when the second pen category is selected by the pen category selection unit 132. Thus, by shortening the first time interval in accordance with the first time-interval proportional coefficient and the writing velocity and by shortening the second time interval in accordance with the second time-interval proportional coefficient and the writing velocity, it is possible to enhance the reproducibility of the tactile sensation in writing for each pen category and easily recognize the difference between the pen categories.

The first unit vibration waveform may have a first pen shaft direction unit vibration waveform and a first different direction unit vibration waveform, the first pen shaft direction unit vibration waveform being capable of causing the vibration element 150 to generate vibration in a pen shaft direction of the pen body 100A, and the first different direction unit vibration waveform being capable of causing the vibration element 150 to generate vibration in a direction different from the pen shaft direction. The second unit vibration waveform may have a second pen shaft direction unit vibration waveform and a second different direction unit vibration waveform, the second pen shaft direction unit vibration waveform being capable of causing the vibration element 150 to generate vibration in the pen shaft direction, and the second different direction unit vibration waveform being capable of causing the vibration element 150 to generate vibration in the direction different from the pen shaft direction. By using the vibration in the pen shaft direction and the vibration in the direction different from the pen shaft direction, it is possible to provide the pen-type input device 100 capable of presenting a further tactile sensation of actual writing.

The pen-type input device may further include a writing-angle detection unit configured to detect a writing angle between the pen body 100A and a writing surface of the tablet computer 200, the writing surface being a writing target, in which the control unit (the waveform generation unit 134 and the waveform output unit 135) may be configured to: increase a ratio between the first pen shaft direction unit vibration waveform and the second pen shaft direction unit vibration waveform to be larger than a ratio between the first different direction unit vibration waveform and the second different direction unit vibration waveform as the writing angle increases, and decrease the ratio between the first pen shaft direction unit vibration waveform and the second pen shaft direction unit vibration waveform to be smaller than the ratio between the first different direction unit vibration waveform and the second different direction unit vibration waveform as the writing angle decreases. By adjusting the ratio between the vibration in the pen shaft direction and the vibration in the direction different from the pen shaft direction, it is possible to reproduce a different tactile sensation in accordance with a difference in writing angles and to provide the pen-type input device 100 capable of presenting a further tactile sensation of actual writing.

The direction different from the first direction may be a direction in which writing is performed with the pen body 100A. By adjusting the ratio between the vibration in the pen shaft direction and the vibration in the writing direction in accordance with the writing angle, it is possible to provide the pen-type input device 100 capable of presenting a further tactile sensation of actual writing.

The writing-angle detection unit may include: an accelerometer 110B configured to detect a pen attitude of the pen body 100A, a communication unit 110C (acquisition unit) configured to acquire a device attitude of the tablet computer 200 from the tablet computer 200, and an angle calculation unit 133 configured to calculate the writing angle based on the pen attitude and the device attitude, the pen attitude being detected by the accelerometer 110B, and the device attitude being acquired by the communication unit 110C (acquisition unit). By adjusting the ratio between the vibration in the pen shaft direction and the vibration in the direction different from the pen shaft direction in accordance with the writing angle obtained by accurate calculation based on the pen attitude and the device attitude, it is possible to reproduce a different tactile sensation in accordance with a difference in writing angles and to provide the pen-type input device 100 capable of presenting a further tactile sensation of actual writing.

A pen-type input device 100 includes: a pen body 100A; a vibration element 150 accommodated inside the pen body 100A; a pen category selection unit 132 configured to select a first pen category or a second pen category; a memory 136 configured to store a first unit vibration waveform and a second unit vibration waveform, the first unit vibration waveform corresponding to the first pen category, and the second unit vibration waveform corresponding to the second pen category; a control unit (the waveform generation unit 134 and the waveform output unit 135) configured to perform drive control of the vibration element 150 by repeatedly using the first unit vibration waveform or the second unit vibration waveform corresponding to the first pen category or the second pen category selected by the pen category selection unit 132; and a gyroscope sensor 110A configured to detect a writing velocity of the pen body 100A, in which the first unit vibration waveform has a first pen shaft direction unit vibration waveform and a first different direction unit vibration waveform, the first pen shaft direction unit vibration waveform being capable of causing the vibration element 150 to generate vibration in a pen shaft direction of the pen body 100A, and the first different direction unit vibration waveform being capable of causing the vibration element 150 to generate vibration in a direction different from the pen shaft direction, and the second unit vibration waveform has a second pen shaft direction unit vibration waveform and a second different direction unit vibration waveform, the second pen shaft direction unit vibration waveform being capable of causing the vibration element 150 to generate vibration in the pen shaft direction, and the second different direction unit vibration waveform being capable of causing the vibration element 150 to generate vibration in the direction different from the pen shaft direction. By using the vibration of the first pen shaft direction unit vibration waveform in the pen shaft direction and the vibration of the first different direction unit vibration waveform in the direction different from the pen shaft direction for the first pen category and using the vibration of the second pen shaft direction unit vibration waveform in the pen shaft direction and the vibration of the second different direction unit vibration waveform in the direction different from the pen shaft direction for the second pen category, it is possible to provide the pen-type input device 100 capable of presenting a further tactile sensation of actual writing.

The pen-type input device may further include a writing-angle detection unit configured to detect a writing angle between the pen body 100A and a writing surface of the tablet computer 200, the writing surface being a writing target, in which the controller (the waveform generation unit 134 and the waveform output unit 135) may be configured to: increase a ratio between the first pen shaft direction unit vibration waveform and the second pen shaft direction unit vibration waveform to be larger than a ratio between the first different direction unit vibration waveform and the second different direction unit vibration waveform as the writing angle increases, and decrease the ratio between the first pen shaft direction unit vibration waveform and the second pen shaft direction unit vibration waveform to be smaller than the ratio between the first different direction unit vibration waveform and the second different direction unit vibration waveform as the writing angle decreases. By adjusting the ratio between the vibration in the pen shaft direction and the vibration in the direction different from the pen shaft direction in accordance with the writing angle obtained by accurate calculation based on the pen attitude and the device attitude, it is possible to reproduce a different tactile sensation in accordance with a difference in writing angles and to provide the pen-type input device 100 capable of presenting a further tactile sensation of actual writing.

The direction different from the first direction may be a direction in which writing is performed with the pen body 100A. By adjusting the ratio between the vibration in the pen shaft direction and the vibration in the writing direction in accordance with the writing angle, it is possible to provide the pen-type input device 100 capable of presenting a further tactile sensation of actual writing.

The writing-angle detection unit may include: an accelerometer 110B configured to detect a pen attitude of the pen body 100A, a communication unit 110C (acquisition unit) configured to acquire a device attitude of the tablet computer 200 from the tablet computer 200, and an angle calculation unit 133 configured to calculate the writing angle based on the pen attitude and the device attitude, the pen attitude being detected by the accelerometer 110B, and the device attitude being acquired by the communication unit 110C (acquisition unit). By adjusting the ratio between the vibration in the pen shaft direction and the vibration in the direction different from the pen shaft direction in accordance with the writing angle obtained by accurate calculation based on the pen attitude and the device attitude, it is possible to reproduce a different tactile sensation in accordance with a difference in writing angles and to provide the pen-type input device 100 capable of presenting a further tactile sensation of actual writing.

An input system includes: a pen-type input device 100 having a pen body 100A; a detection device configured to detect a contact between a writing surface and the pen-type input device 100; a vibration element 150; a pen category selection unit 132 configured to select a first pen category or a second pen category; a memory 136 configured to store a first vibration waveform and a second vibration waveform, the first vibration waveform corresponding to the first pen category, and the second vibration waveform corresponding to the second pen category; a control unit (the waveform generation unit 134 and the waveform output unit 135) configured to perform drive control of the vibration element 150 based on the first vibration waveform corresponding to the first pen category or the second vibration waveform corresponding to the second pen category, the first pen category or the second pen category being selected by the pen category selection unit 132; and a writing-velocity detection unit configured to detect a writing velocity of the pen body, in which the control unit (the waveform generation unit 134 and the waveform output unit 135) is configured to: drive the vibration element 150 so as to increase a vibration intensity by a first degree as the writing velocity increases, when the first pen category is selected by the pen category selection unit 132, and drive the vibration element 150 so as to increase the vibration intensity by a second degree, which is smaller than the first degree, as the writing velocity increases, or drive the vibration element 150 with the vibration intensity of a constant level regardless of the writing velocity, when the second pen category is selected by the pen category selection unit 132. Since a different relationship between the writing velocity and the vibration intensity can be reproduced depending on the pen category, it is possible to enhance the reproducibility of the tactile sensation in writing for each pen category and easily recognize the difference between the pen categories.

Therefore, it is possible to provide the pen-type input device 100 capable of presenting a tactile sensation of actual writing.

Although the pen-type input device and input system of the exemplary embodiments of the present disclosure have been described above, the present disclosure is not limited to the embodiments specifically disclosed, and various modifications and changes are possible without departing from the scope of the claims.

What is claimed is:

1. A pen-type input device, comprising:
- a pen body;
- a vibration actuator accommodated inside the pen body;
- a pen category selection processor configured to select a first pen category or a second pen category;
- a storage configured to store a first vibration waveform and a second vibration waveform, the first vibration waveform corresponding to the first pen category, and the second vibration waveform corresponding to the second pen category;
- a control processor configured to perform drive control of the vibration actuator based on the first vibration waveform corresponding to the first pen category or the second vibration waveform corresponding to the second pen category, the first pen category or the second pen category being selected by the pen category selection processor; and
- a writing-velocity detection processor configured to detect a writing velocity of the pen body, wherein
- the control processor is further configured to:
  - drive the vibration actuator so as to increase a vibration intensity by a first degree as the writing velocity increases, when the first pen category is selected by the pen category selection processor, and
  - drive the vibration actuator so as to increase the vibration intensity by a second degree, which is smaller than the first degree, as the writing velocity increases, or drive the vibration actuator with the vibration intensity of a constant level regardless of the writing velocity, when the second pen category is selected by the pen category selection processor.

2. The pen-type input device according to claim 1, wherein
- the control processor is further configured to:
  - drive the vibration actuator so as to increase an amplitude of the first vibration waveform in accordance with a first velocity proportional coefficient and the writing velocity, when the first pen category is selected by the pen category selection processor, and
  - drive the vibration actuator so as to increase an amplitude of the second vibration waveform in accordance with a second velocity proportional coefficient, which is smaller than the first velocity proportional coefficient, and the writing velocity, when the second pen category is selected by the pen category selection processor.

3. A pen-type input device, comprising:
- a pen body;
- a vibration actuator accommodated inside the pen body;
- a pen category selection processor configured to select a first pen category or a second pen category;
- a storage configured to store a first vibration waveform and a second vibration waveform, the first vibration waveform corresponding to the first pen category, and the second vibration waveform corresponding to the second pen category;
- a control processor configured to perform drive control of the vibration actuator based on the first vibration waveform corresponding to the first pen category or the second vibration waveform corresponding to the second pen category, the first pen category or the second pen category being selected by the pen category selection processor; and a writing-pressure detection processor configured to detect a writing pressure of the pen body, wherein the control processor is further configured to:

drive the vibration actuator so as to increase a vibration intensity by a first degree as the writing pressure increases, when the first pen category is selected by the pen category selection processor, and drive the vibration actuator so as to increase the vibration intensity by a second degree, which is smaller than the first degree, as the writing pressure increases, or drive the vibration actuator with the vibration intensity of a constant level regardless of the writing pressure, when the second pen category is selected by the pen category selection processor.

4. The pen-type input device according to claim 3, wherein the control processor is further configured to:

drive the vibration actuator so as to increase an amplitude of the first vibration waveform in accordance with a first writing-pressure proportional coefficient and the writing pressure, when the first pen category is selected by the pen category selection processor, and drive the vibration actuator so as to increase an amplitude of the second vibration waveform in accordance with a second writing-pressure proportional coefficient, which is smaller than the first writing-pressure proportional coefficient, and the writing pressure, when the second pen category is selected by the pen category selection processor.

5. The pen-type input device according to claim 1, wherein the first vibration waveform has a first pen shaft direction vibration waveform and a first different direction vibration waveform, the first pen shaft direction vibration waveform being capable of causing the vibration actuator to generate vibration in a pen shaft direction of the pen body, and the first different direction vibration waveform being capable of causing the vibration actuator to generate vibration in a direction different from the pen shaft direction, and the second vibration waveform has a second pen shaft direction vibration waveform and a second different direction vibration waveform, the second pen shaft direction vibration waveform being capable of causing the vibration actuator to generate vibration in the pen shaft direction, and the second different direction vibration waveform being capable of causing the vibration actuator to generate vibration in the direction different from the pen shaft direction.

6. The pen-type input device according to claim 5, further comprising:

a writing-angle detection processor configured to detect a writing angle between the pen body and a writing surface of an electronic device, the writing surface being a writing target, wherein the control processor is further configured to:

increase a ratio between the first pen shaft direction vibration waveform and the second pen shaft direction vibration waveform to be larger than a ratio between the first different direction vibration waveform and the second different direction vibration waveform as the writing angle increases, and decrease the ratio between the first pen shaft direction vibration waveform and the second pen shaft direction vibration waveform to be smaller than the ratio between the first different direction vibration waveform and the second different direction vibration waveform as the writing angle decreases.

7. The pen-type input device according to claim 5 wherein the direction different from the pen shaft direction is a direction in which writing is performed with the pen body.

8. The pen-type input device according to claim 6, wherein the writing-angle detection processor is further configured to:

detect a pen attitude of the pen body, acquire a device attitude of the electronic device from the electronic device, and calculate the writing angle based on the detected pen attitude and the acquired device attitude.

9. A pen-type input device, comprising:

a pen body;

a vibration actuator accommodated inside the pen body;

a pen category selection processor configured to select a first pen category or a second pen category;

a storage configured to store a first unit vibration waveform and a second unit vibration waveform, the first unit vibration waveform corresponding to the first pen category, and the second unit vibration waveform corresponding to the second pen category;

a control processor configured to perform drive control of the vibration actuator by repeatedly outputting the first unit vibration waveform corresponding to the first pen category or the second unit vibration waveform corresponding to the second pen category, the first pen category or the second pen category being selected by the pen category selection processor; and a writing-velocity detection processor configured to detect a writing velocity of the pen body, wherein the control processor is further configured to:

drive the vibration actuator so as to shorten a first time interval for outputting the first unit vibration waveform as the writing velocity increases, when the first pen category is selected by the pen category selection processor, and drive the vibration actuator so as to shorten a second time interval for outputting the second unit vibration waveform as the writing velocity increases, or drive the vibration actuator at the second time interval of a constant level regardless of the writing velocity, when the second pen category is selected by the pen category selection processor, and the second time interval is longer than the first time interval.

10. The pen-type input device according to claim 9, wherein a controller is configured to:

shorten the first time interval in accordance with a first time-interval proportional coefficient and the writing velocity to drive the vibration actuator, when the first pen category is selected by the pen category selection processor, and shorten the second time interval in accordance with a second time-interval proportional coefficient, which is larger than the first time-interval proportional coefficient, and the writing velocity to drive the vibration actuator, when the second pen category is selected by the pen category selection processor.

11. The pen-type input device according to claim 9, wherein the first unit vibration waveform has a first pen shaft direction unit vibration waveform and a first different direction unit vibration waveform, the first pen shaft direction unit vibration waveform being capable of causing the vibration actuator to generate vibration in a pen shaft direction of the pen body, and the first different direction unit vibration waveform being capable of causing the vibration actuator to generate vibration in a direction different from the pen shaft direction, and the second unit vibration waveform has a second pen shaft direction unit vibration waveform and a second different direction unit vibration waveform, the second pen shaft direction unit vibration waveform being capable of causing the vibration actuator to generate vibration in the pen shaft direction, and the second different direction unit vibration waveform being capable of causing the vibration actuator to generate vibration in the direction different from the pen shaft direction.

12. The pen-type input device according to claim 11, further comprising:

a writing-angle detection processor configured to detect a writing angle between the pen body and a writing surface of an electronic device, the writing surface being a writing target, wherein the control processor is further configured to:

increase a ratio between the first pen shaft direction unit vibration waveform and the second pen shaft direction unit vibration waveform to be larger than a ratio between the first different direction unit vibration waveform and the second different direction unit vibration waveform as the writing angle increases, and decrease the ratio between the first pen shaft direction unit vibration waveform and the second pen shaft direction unit vibration waveform to be smaller than the ratio between the first different direction unit vibration waveform and the second different direction unit vibration waveform as the writing angle decreases.

13. The pen-type input device according to claim 11, wherein the direction different from the pen shaft direction is a direction in which writing is performed with the pen body.

14. The pen-type input device according to claim 12, wherein the writing-angle detection processor is further configured to:

detect a pen attitude of the pen body, acquire a device attitude of the electronic device from the electronic device, and calculate the writing angle based on the detected pen attitude and the acquired device attitude.

15. A pen-type input device, comprising:

a pen body;

a vibration actuator accommodated inside the pen body;

a pen category selection processor configured to select a first pen category or a second pen category;

a storage configured to store a first unit vibration waveform and a second unit vibration waveform, the first unit vibration waveform corresponding to the first pen category, and the second unit vibration waveform corresponding to the second pen category;

a control processor configured to perform drive control of the vibration actuator by repeatedly using the first unit vibration waveform or the second unit vibration waveform corresponding to the first pen category or the second pen category selected by the pen category selection processor; and a writing-velocity detection processor configured to detect a writing velocity of the pen body, wherein the first unit vibration waveform has a first pen shaft direction unit vibration waveform and a first different direction unit vibration waveform, the first pen shaft direction unit vibration waveform being capable of causing the vibration actuator to generate vibration in a pen shaft direction of the pen body, and the first different direction unit vibration waveform being capable of causing the vibration actuator to generate vibration in a direction different from the pen shaft direction, and the second unit vibration waveform has a second pen shaft direction unit vibration waveform and a second different direction unit vibration waveform, the second pen shaft direction unit vibration waveform being capable of causing the vibration actuator to generate vibration in the pen shaft direction, and the second different direction unit vibration waveform being capable of causing the vibration actuator to generate vibration in the direction different from the pen shaft direction.

16. The pen-type input device according to claim 15, further comprising:

a writing-angle detection processor configured to detect a writing angle between the pen body and a writing surface of an electronic device, the writing surface being a writing target, wherein the control processor is further configured to:

increase a ratio between the first pen shaft direction unit vibration waveform and the second pen shaft direction unit vibration waveform to be larger than a ratio between the first different direction unit vibration waveform and the second different direction unit vibration waveform as the writing angle increases, and decrease the ratio between the first pen shaft direction unit vibration waveform and the second pen shaft direction unit vibration waveform to be smaller than the ratio between the first different direction unit vibration waveform and the second different direction unit vibration waveform as the writing angle decreases.

17. The pen-type input device according to claim 15, wherein a direction different from the first direction is a direction in which writing is performed with the pen body.

18. The pen-type input device according to claim 16, wherein the writing-angle detection processor is further configured to:

detect a pen attitude of the pen body, acquire a device attitude of the electronic device from the electronic device, and calculate the writing angle based on the detected pen attitude and the acquired device attitude.

19. An input system, comprising:

a pen-type input device having a pen body;

a detection device configured to detect a contact between a writing surface and the pen-type input device;

a vibration actuator;

a pen category selection processor configured to select a first pen category or a second pen category;

a storage configured to store a first vibration waveform and a second vibration waveform, the first vibration waveform corresponding to the first pen category, and the second vibration waveform corresponding to the second pen category;

a control processor configured to perform drive control of the vibration actuator based on the first vibration waveform corresponding to the first pen category or the second vibration waveform corresponding to the second pen category, the first pen category or the second pen category being selected by the pen category selection processor; and a writing-velocity detection processor configured to detect a writing velocity of the pen body, wherein the control processor is further configured to:

drive the vibration actuator so as to increase a vibration intensity by a first degree as the writing velocity increases, when the first pen category is selected by the pen category selection processor, and drive the vibration actuator so as to increase the vibration intensity by a second degree, which is smaller than the first degree, as the writing velocity increases, or drive the vibration actuator with the vibration intensity of a constant level regardless of the writing velocity, when the second pen category is selected by the pen category selection processor.

* * * * *